United States Patent [19]

Skarbo et al.

[11] Patent Number: 5,778,053
[45] Date of Patent: Jul. 7, 1998

[54] ANSWERING MACHINE SERVICES FOR DATA CONFERENCES

[75] Inventors: Rune A. Skarbo, Hillsboro; Peter J. Kaufman, Banks, both of Oreg.

[73] Assignee: Intel Corporation, Santa Clara, Calif.

[21] Appl. No.: 576,288

[22] Filed: Dec. 21, 1995

[51] Int. Cl.⁶ .................................................. H04M 11/00
[52] U.S. Cl. .................. 379/93.21; 348/14; 348/17; 379/88
[58] Field of Search ............ 348/13–17; 379/90, 379/142, 67, 202, 90.01, 93.01, 93.08, 93.17, 93.21, 93.24; 395/330; 364/514 A–514 C

[56] References Cited

U.S. PATENT DOCUMENTS

| | | | |
|---|---|---|---|
| 4,985,913 | 1/1991 | Shalom et al. | 379/142 |
| 5,046,079 | 9/1991 | Hashimoto | 348/14 |
| 5,345,258 | 9/1994 | Matsubara et al. | 348/14 |
| 5,412,418 | 5/1995 | Nishimura et al. | 348/14 |
| 5,528,285 | 6/1996 | Morikawa et al. | 348/14 |
| 5,550,754 | 8/1996 | McNelley et al. | 348/13 |
| 5,559,868 | 9/1996 | Blonder | 348/13 |
| 5,594,859 | 1/1997 | Palmer et al. | 395/330 |

*Primary Examiner*—Wing F. Chan
*Assistant Examiner*—Stephen W. Palan
*Attorney, Agent, or Firm*—N. Stephan Kinsella, Esq.; William H. Murray, Esq.

[57] ABSTRACT

A method, apparatus, and storage medium for receiving, with a callee of a data conferencing system, a data conferencing call from a caller of the data conferencing system. An answering machine answers the call if the callee does not answer the call. A pre-recorded callee greeting is displayed to the caller to notify the caller that the callee is not answering the call, and the caller is prompted to leave a message.

32 Claims, 14 Drawing Sheets

ANSWERING MACHINE SERVICES FOR DATA CONFERENCES

BACKGROUND OF THE INVENTION

1. Field of the Invention

The present invention relates to data conferencing systems, and, in particular, to mechanisms for providing answering machine services for data conferences.

2. Description of the Related Art

In computer systems such as data conferencing systems, a plurality of users are provided with the ability to have an electronic on-line meeting even if the users are not physically in the same room or building. Such data conferencing application programs have enabled the ability to have a meeting wherein all users participate in the meeting through their individual computer systems and share, typically, audio and video ("AV") data, and/or other types of information or data. As used herein, "data conferencing system" refers to conferencing systems that allow users to share one or more types of data, including video, audio, and other forms of data. Such data conferencing systems are also sometimes referred to as teleconferencing or video conferencing systems.

In such systems, there are various types of data, or "data streams," that it is useful to store and retrieve. These data streams can be audio data streams, video data streams, or other types (i.e., non-video, non-audio) of data streams. Storage and retrieval of AV and other types of data streams is also referred to as record and playback, or write and read, of such data. Some current methods, such as those using the Microsoft® audio-video interleave ("AVI") file standard, allow the recording and indexing of AV streams.

In such data conferencing systems, a user (the "caller") will typically attempt to initiate a data conference with one or more users (the "callee(s)"), i.e. the caller will attempt to call the callee(s). Callers and callees are users of a system that supports data conferences, and typically each use a physical piece of hardware such as a personal computer ("PC")-based workstation that is a physical node or element interconnected with a network such as a LAN. For example, both the caller and callee may be associated with their own desktop workstations which physically reside within the respective user's office. The caller may attempt to place a data conferencing call from his workstation, and the callee may receive data conferencing calls from his workstation, and vice-versa as their roles are reversed. For convenience the workstation itself utilized by a user may be referred to as the user or as the caller or callee.

In a point-to-point data conference, a single user or "endpoint" attempts to establish a data conference with another user. This conference may be established via a communications medium such as a local-area network ("LAN"), wide-area network ("WAN"), telephone link via modems, or Integrated Services Digital Network ("ISDN") links, and the like. In a multi-point data conference, more than two users participate in the conference. In such a multi-point data conference, one or more multi-point conferencing units ("MCUs") may also be utilized to transmit data to and from various nodes or "endpoints" of the conferencing system. These nodes may be interconnected via a LAN or other communication medium as described above. Multi-point conferences may also be established without utilizing MCUs.

Often the callee who is the object of a caller's attempt to establish, for example, a point-to-point data conference,

2 does not respond to the initiate attempt for any of a variety of reasons—for example, the callee is not present at his workstation to receive the call, or is too busy to answer the call. The caller may, in frustration, terminate the data conference attempt (i.e., "hang up"), and, using a separate communications system such as telephone or e-mail, leave a voice-mail, electronic mail ("e-mail"), or other message for the callee. However, in addition to the bother and cost of employing means other than the data conferencing system to leave a message when a data conference call fails, the user is unable to utilize special features and capabilities of the data conferencing system when leaving the message.

SUMMARY

There is provided herein a method, data conferencing system, and storage medium for receiving, with a callee of a data conferencing system, a data conferencing call from a caller of the data conferencing system. In one embodiment, an answering machine answers the call if the callee does not answer the call. A pre-recorded callee greeting is displayed to the caller to notify the caller that the callee is not answering the call, and the caller is prompted to leave a message.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

System Hardware

Figure 1:
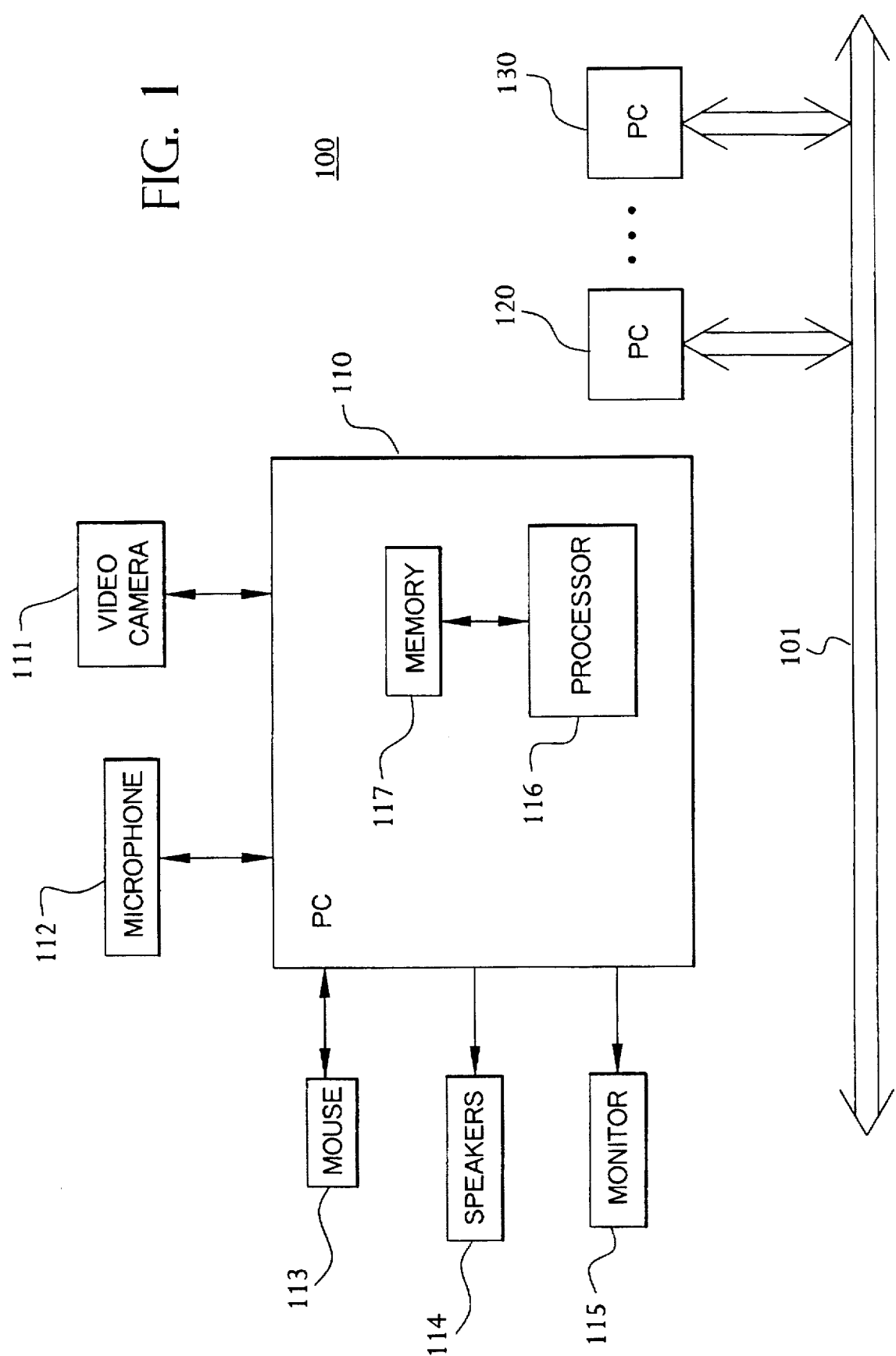
FIG. 1 shows a data conferencing system in accordance with an embodiment of the present invention.

Referring now to FIG. 1, there is shown data conferencing system 100, in accordance with an embodiment of the present invention. Data conferencing system 100 comprises a plurality of nodes or personal computers ("PCs") 110, 120, 130. Personal computer or node 110 comprises a processor 116, memory 117, video camera 111, microphone 112, mouse 113, speakers 114, and monitor 115. Nodes 110, 120, 130 and other nodes of the data conference are interconnected via medium 101. Medium 101 may be, for example, a communication channel such as an Integrated Services Digital Network ("ISDN"). As will be understood, various nodes of a conferencing system may be connected through a variety of communication media, including local area networks ("LANs"), plain-old telephone lines ("POTS", sometimes referred to as public switched telephone networks ("PSTN")), and the like. In a multi-point conferencing system, one or more multi-point conferencing units ("MCUs") may also be utilized, as will be understood by those skilled in the art, to transmit data to and from various nodes or "endpoints" of the conferencing system. Nodes may be interconnected via an ISDN link or through a local area network ("LAN"), in addition to various other communications media. Those skilled in the art will appreciate that nodes of a conferencing system may, in general, be connected directly to the communications medium such as a LAN or through an MCU, and that a conferencing system may comprise other nodes or elements such as routers or servers.

Processor 116 may be a general-purpose programmable processor, such as an Intel® Pentium™ processor. Those skilled in the art will also appreciate that processors of nodes of conferencing system 100 may also be a special-purpose video processor such as the Intel® 82750PB. As will be appreciated, the various peripherals and components of a node such as those of node 110 may vary from those of other nodes. Thus, node 120 and node 130 may be configured identically to or differently than node 110. It will further be understood that a node may be implemented on any suitable computer system in addition to PC-based systems.

Data Conferencing

As explained, each node 110, 120, 130 of a data conferencing system is used by a user (or "agent") of the conference. In a typical data conferencing session there are several AV streams. At any given time during the conference, there are a particular number of such streams in existence. Each AV stream may have a start time, end time, and length independent of other AV streams that constitute the data conference. Thus, some AV streams overlap temporally, some have the same start and end times, and some do not overlap temporally at all (i.e. one ends before the other begins). As an example, users 1, 2, an 3 may begin and end a data conference substantially simultaneously. The data conference may last for, say 30 minutes, from minute 0 to minute 30. User 4 may enter at minute 1 and exit the conference at minute 10, while user 5 may enter the conference at minute 20 and exit at minute 25. As will be understood, each user may have associated at least an audio and a video stream. Other streams may also be part of the conference, such as an audio and video stream from a third-party supplier, such as a news channel, which is viewed or accessible by the participants of the conference.

It will be understood that, during a point-to-point data conference, typically each endpoint simultaneously transmits data, such as AV data, to the other. In a multipoint conference, typically an MCU it utilized to route data between various endpoints on a network such as a LAN. Such an MCU, because of communications and processing bandwidth constraints and other constraints, typically receives video streams from several of the endpoints and broadcasts only one of the video streams to all the endpoints, and mixes the audio streams received from the endpoints and transmits this mixed audio stream out to the endpoints. Such a decision of which video stream is to be broadcasted in the conference may be decided, for instance, by whichever endpoint user is currently speaking, or by a chair control who decides, as will be appreciated. Given sufficient processing and communications bandwidth capabilities, any number of video streams from the participants in the conference may be routed to the endpoints of the conference by the MCU.

Answering Machine Services

The present invention provides a means for data conferencing callers to leave messages for data conferencing callees by providing "answering machine" capabilities, i.e. a means for answering the callee's incoming data conferencing call even when the callee himself does not answer, and for allowing the caller to leave a message comprising AV data.

In one embodiment of the present invention, the answering machine ("AM") system may be text-only based. In this embodiment, the callee specifies a text greeting to be displayed on the caller's machine when a call is not answered by the callee (e.g., after a specified number of rings). The caller is then prompted to leave a text message, which may then be transmitted to and stored in an AM "message list" of the callee. As will be appreciated, one reason for utilizing such a text-only embodiment instead of allowing AV data as well may be to conserve storage space, for example hard disk space of the user's machine or local server or other data storage means.

In another embodiment, both audio and video, as well as text and/or other types of information (such as file attachments) may be supported by the AM services. Such an AM provides a means for a potential callee to record one or more AV greeting(s), which may be played back when the AM answers an incoming call. For instance, when a caller calls the callee and the call is unanswered by the callee, the AM answers the call and plays a prerecorded AV greeting for the caller, who is then prompted to leave an AV message. As with the text-based message described above, this AV message is then transmitted to and stored in the callee's AM message list. Thus, at a later time, the callee may view its AM message list and selectively read, view, or otherwise access various messages left by previous data conferencing callers. As will be understood, a mixture of the text-only and full AV support described above is also possible in other embodiments, for example the user may leave a full AV greeting but allow only text-based messages to be left.

In one embodiment, the present invention provides a "teleprompter" type function that assists the user in recording a greeting or other type of message. Typically, a user will sit in front of a PC-based workstation facing the PC's monitor and data conferencing video camera, which is typically mounted on top of the monitor. Sometimes it may be difficult for the user to recall exactly the wording or substance of the message he intended to leave, and will sometimes, for example, prepare rough notes on a notepad and occasionally glance at this notepad during the recording of the AV greeting, which may interrupt the flow of the recorded message or the ability of the user to face the camera during the recording. As will be understood, while recording such an AV greeting, the user typically faces generally in the direction of the monitor and camera. While recording the AV greeting, a window on the monitor may simultaneously display the video being recorded, to supply the user with useful feedback information for camera positioning purposes, and the like. In one embodiment, the greeting preparation applet first asks the user whether the teleprompter function is desired. If so, the user is presented a text box in which to type a prepared message to guide the user in leaving the AV greeting. Then, when the user is ready to begin recording the AV greeting, the monitor displays a text box showing the prepared message. Because the camera and monitor are physically proximate and the user essentially faces both when recording the greeting, the user may easily read the prepared message off of the monitor screen while also facing the camera. As will be appreciated, in case of a longer prepared text message that is too long to fit within a convenient window displayed on the monitor, the user may, during the recording of the greeting, manipulate a peripheral such as a mouse or keyboard to scroll the prepared message as he reads it. Alternatively, the message may automatically scroll at a predetermined rate during the recording of the greeting.

The present invention, in one embodiment, provides a means for allowing the user who is a potential data conferencing callee to (1) enter, name, and store several greetings for different situations (e.g., in office but away from my desk; out of town; working at home today), which may be activated as desired; (2) specify how long the AM should wait before the AM answers the call (e.g., after x seconds or after y rings); and (3) whether to utilize text only as described above or full AV support. Depending upon the types of message data supported, the caller is, in one embodiment, also allowed to select what type of message to leave (e.g., text, audio only, or AV). Thus, the callee may, in one embodiment, specify whether to display a text greeting or an AV greeting; and whether to allow only text messages or AV messages. The callee may also select the maximum length and/or size for an AV message (e.g., 2 minutes, or x megabytes). Additionally, in one embodiment, before allowing the caller to leave a message, the AM first checks to see whether there is sufficient storage space to store a message of maximum allowable length and, if not, allows the caller to leave only a text message. In another embodiment, the AM allows the user to leave one or more attachments with the message left. These services and functions are also further discussed below with reference to FIG. 15.

Answering Machine Functions

Figure 2:
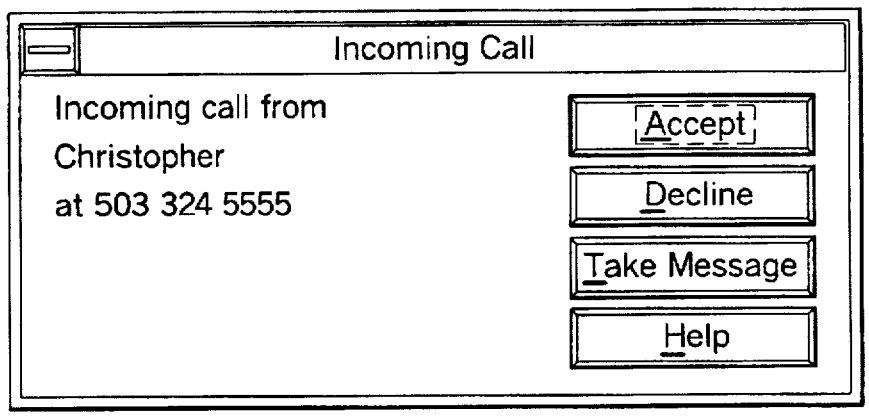
FIG. 2 shows an incoming call dialog window illustrative of a dialog displayed on the screen of the callee's local workstation when a data conferencing call is placed by a caller.

Referring now to FIG. 2, there is shown an incoming call dialog window 200 illustrative of a dialog displayed on the screen of the callee's local workstation when a data conferencing call is placed by a caller. As will be appreciated, if the callee is present when this dialog 200 is displayed, the "Accept" and "Decline" buttons may be clicked by the callee if desired. Alternatively, the "Take a Message" button may be clicked if the callee does not wish to receive a call but does wish to allow the caller the opportunity to leave a message. In one embodiment of the present invention, the user may also enable a "Do not disturb" feature which automatically forwards all incoming calls to the AM without displaying the incoming call dialog window 200.

As will be understood, in alternative embodiments, the callee may be supplied with caller identification information along with choices such as offered in incoming call dialog window 200, to provide the callee with the ability to make a more informed decision as to whether to Accept, Decline, or Take a Message. The callee may also be given the option to select which greeting will be displayed to the caller. For instance, a greeting leaving emergency contact or other particular information may be selected if the identity of the callee warrants this; otherwise, or if the callee's identity if unfamiliar or unknown, a more generic greeting may be selected. Additionally, the greeting may also have an attachment, for example a file that may be retrieved by the person receiving the greeting. If the callee is simply not present or is otherwise ignoring the incoming call dialog 200, a preselected greeting is played for the caller by AM.

Figure 3:
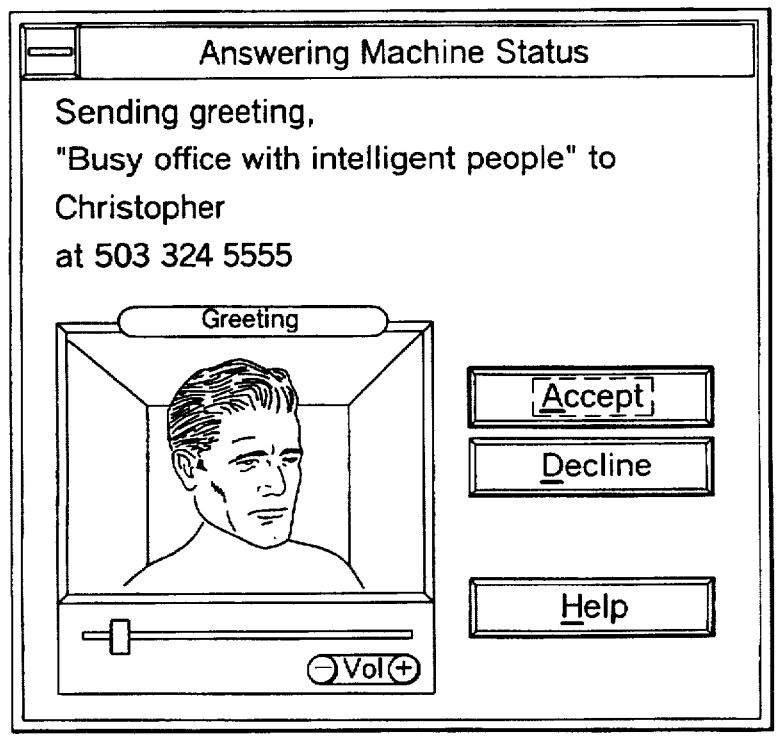
FIG. 3 shows a callee greeting dialog that is displayed for a callee.

While the AM is in use, i.e. while the caller is being serviced by the AM, a dialog such as callee greeting dialog 300 as illustrated in FIG. 3 is displayed for the callee. While this greeting dialog 300 is displayed, the callee may interrupt the AM at any time. The callee may "Accept" the call, thereby causing the AM process to terminate and a data conference manager ("CM") application to take over. Or, the callee may "Decline" the call in which case AM simply hangs up the connection. If the callee does nothing (for instance if the callee is not present and/or if the callee's workstation is not logged on to the network supporting the data conference) then the AM proceeds to provide answering machine services to the caller. Callee greeting dialog 300 disappears when the caller hangs up. Additionally, in one embodiment, the callee is able to view in real-time the message being left by the caller, and may interrupt this message at any time and participate in a data conference with the caller. For instance, while viewing and listening to an AV message being recorded by the caller via the AM services, for example in a window on the callee's workstation monitor, the callee may hear the caller say something particularly pressing or interesting and decide to interrupt the message and "answer" the call. As will be appreciated, such a technique may be utilized for other forms of data as well, for example the callee may view a text message in a window as it is being typed by the caller, or the attaching of a file by the caller to the message, and the like.

Figure 4:
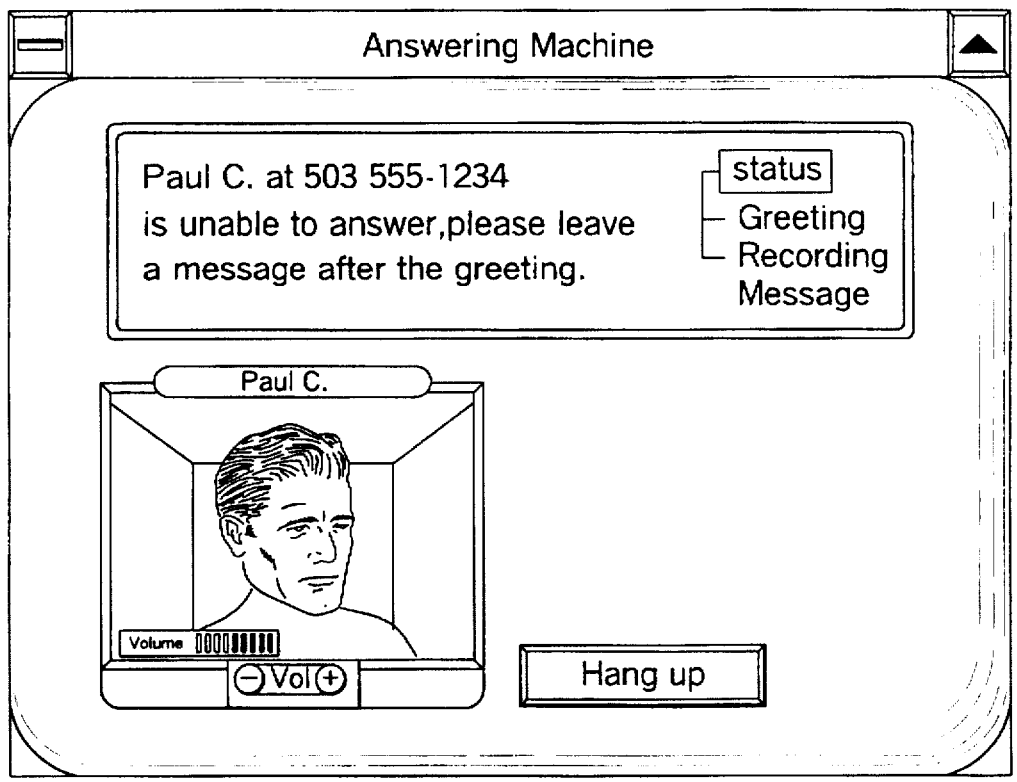
FIG. 4 shown an audio/video ("AV") greeting dialog that is presented to a user by the callee's answering machine ("AM")

When a caller institutes a call that is answered by the callee's AM, the caller receives either a text and/or AV greeting. The caller may either hang up without leaving a message, or may leave a message of a selected type. Referring now to FIG. 4, there is shown an AV greeting dialog 400 which is presented to a user by the callee's AM. As will be understood, the caller may hang up by clicking the "Hang up" button, or may leave a message. The caller may also be presented with buttons (not shown) that allow the caller to select to leave a text only message or an AV message. As illustrated in FIG. 4, the caller may receive both a text greeting and an AV greeting. The caller may adjust the volume with the volume button "Vol" as shown. In alternative embodiments, when the caller is presented in this window with buttons such as "Leave a Text Message" and "Leave an Audio/Video Message," the caller may interrupt the greeting at any time (if the greeting is AV and not text only) by clicking one of the options.

If the caller selects to leave a text only message, a dialog appears (not shown) that allows the caller to enter a text message using the keyboard or other text entry methods. Depressing a "Hang up" button when the user is done entering the message causes the message to be stored in the callee's message list. Additionally, in order to ensure that the caller does not tie up the callee's data conferencing line or communications bus for too long, in one embodiment the callee's system automatically hangs up after some amount of time (which may be specified in a set of default user preferences by the callee). The caller may be kept notified of time remaining, for example by a count down warning clock that appears when only fifteen seconds of recording time are allowed. When this countdown reaches zero, the callee's system hangs up. When the caller is to leave an AV message, a dialog presents a short countdown (e.g., five or ten seconds) to allow the caller to ensure that its camera is positioned correctly.

Any messages from callers that are so recorded by the callee's AM appear in the callee's message list. When there are unread messages in the message list, AM may be configured so that the caller will see one or more of the following indicators: An icon or a symbol thereon such as a red dot will blink; and a status bar and "message list" indicator will indicate that there are unread messages in the message list. In one embodiment, the message list may also include a "call back" feature, whereby the callee in browsing the message list is able to click on a "return call" symbol which causes the callee's computer to automatically attempt to place a data conference call with the caller who has left the currently selected message in the message list.

The AM functions are described in further detail in the following sections.

Answering Machine Operation

The data conference AM and related services described herein may be implemented, as will be appreciated, in a data conference. The services provided by the answering machine may be contained inside of a single executable file, which can be executed several ways. For instance, it may be executed from a main data conferencing menu by the user; or it can be automatically executed on the callee side from a data conference manager when x number of rings have occurred (in this case the data conference manager will typically need to have the answering machine option enabled); or it can be executed on the caller's side when an answering machine process on the callee side has picked up the connection. Services provided by an embodiment of the present the AM include a message/greeting browser, message/greeting playback, trash message/greeting list, AM preferences, greeting recorder, greeting server for incoming calls, greeting display handler for caller, caller message server, callee incoming message handler, object linking and embedding ("OLE") automation server, and the like, as will be appreciated by those skilled in the art and as further described hereinbelow.

In one embodiment, the AM executable file program is an OLE container and all user interface elements are implemented as OLE controls. As will be appreciated, AM is an OLE control (referred to herein as "AMX"), which embeds other OLE controls. Most parts of AM are OLE controls. In addition, AMX being a container, many of the OLE controls it utilizes are OLE containers as well.

User Interface

Figure 5:
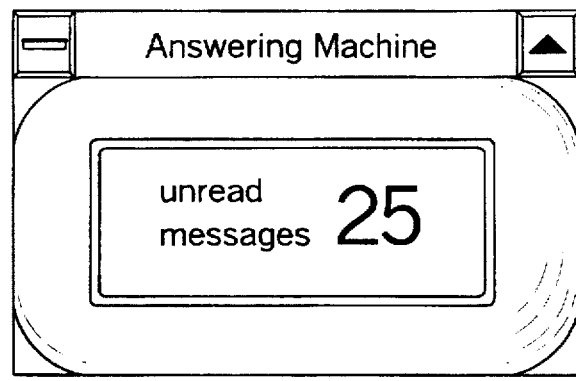
FIG. 5 shows a standby dialog window utilized when the answering machine of the present invention is in standby display mode.
Figure 6:
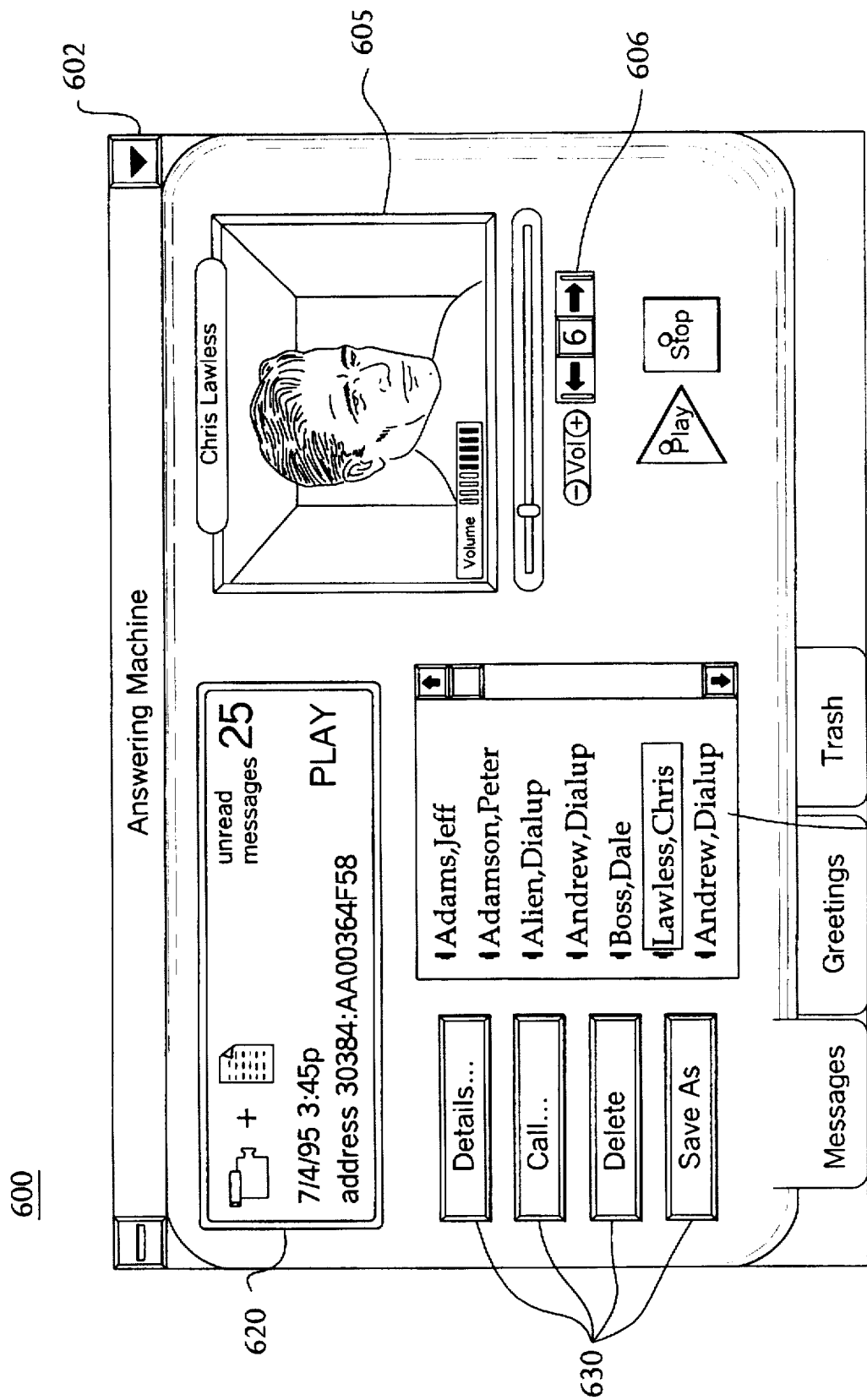
FIG. 6 shows a playback dialog window in display messages state.

The AM has two display modes in one embodiment: "Stand By" display mode and "Playback" display mode. Referring now to FIG. 5, there is shown a "Stand By" dialog window 500 utilized when the answering machine of the present invention is in Stand By display mode. AM in "Stand By" mode is intended to be always running on the user's desktop. Stand By dialog window 500's footprint is small and it uses relatively little resources. In this mode, the user can perform three operations. The operations are: view how many unread messages are available; close the AM application; and, for example, by pushing the "Maximize" button 502, expand AM into "Playback" mode, which is illustrated in FIG. 6. Once the user expands the AM from "Stand By" mode to "Playback" mode, the AM sounds a beep and then starts to play all the unread messages beginning with the first.

Referring now to FIG. 6, there is shown a "Playback" dialog window 600 in display messages state. In "Playback" display mode, the user has all AM features available such as message and greeting browsing, greeting creation, message and greeting deletion, return call, and the like. Also, the user can put AM into "Stand By" mode to reduce the footprint by pressing the "Minimize" button 602. In "Playback" mode 600, the user can select from three states: Messages, Greetings, and Trash, as shown by the three "tabs" having said labels. Dialog window 600 is shown in the "message state," in which state dialog window 600 displays a list all messages, read and unread. As the user browses through the list, the user interface ("UI") presented by this dialog is updated to reflect the new selection. This is commonly called "tracking." During "tracking," the video frame subwindow 605 shows the first frame of the currently-selected message, the status window reflects the status of the current message, and the message selection display 606 shows the message number. If the user uses the message selection LCD control to browse messages, the newly selected message will start to playback and the message list and the LCD status will be updated to reflect the new selection. The user can stop the playback at any time by pressing the stop button and resume by pressing the play button.

Figure 7:
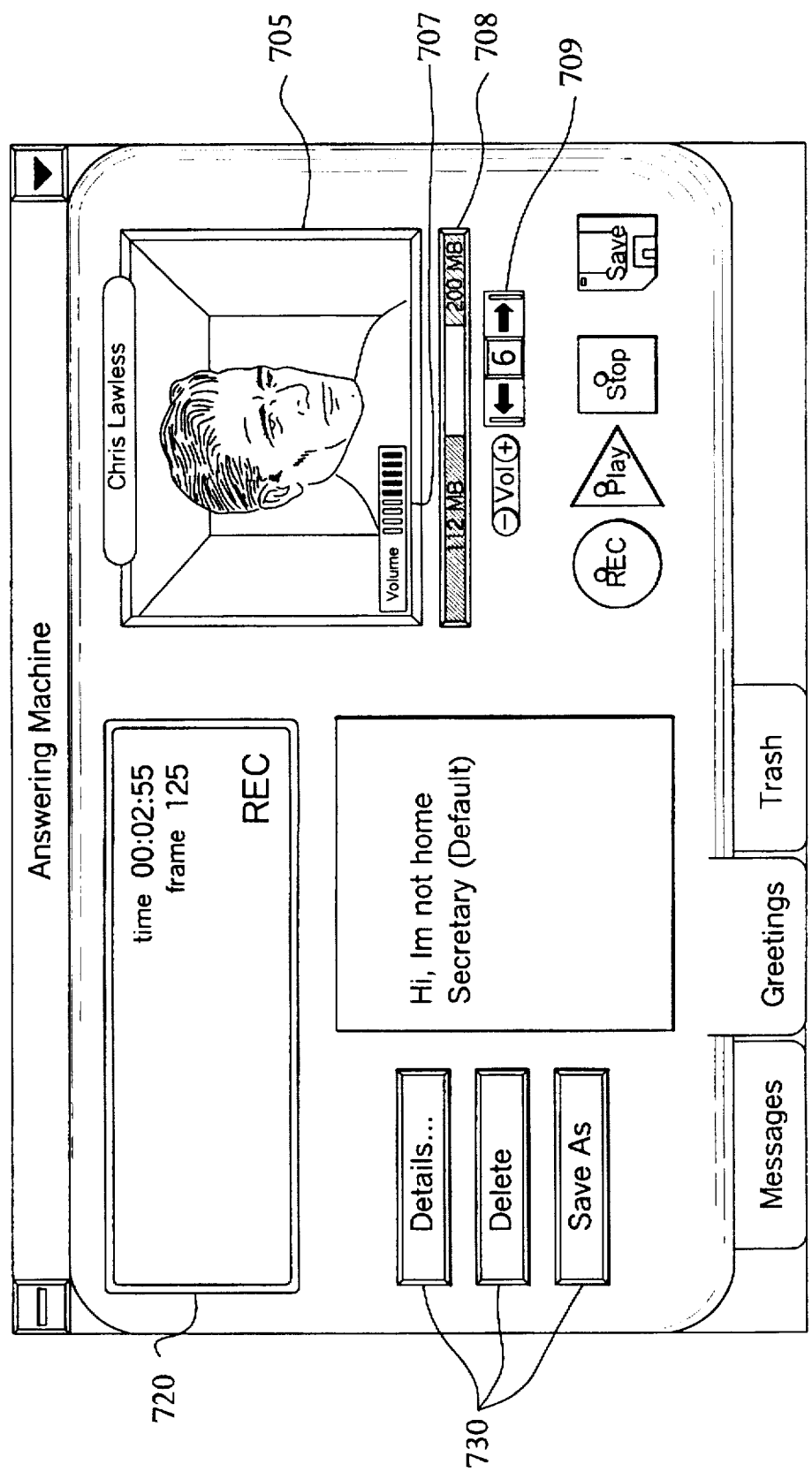
FIG. 7 shows the playback dialog window of FIG. 6 in display greetings state.
Figure 8:
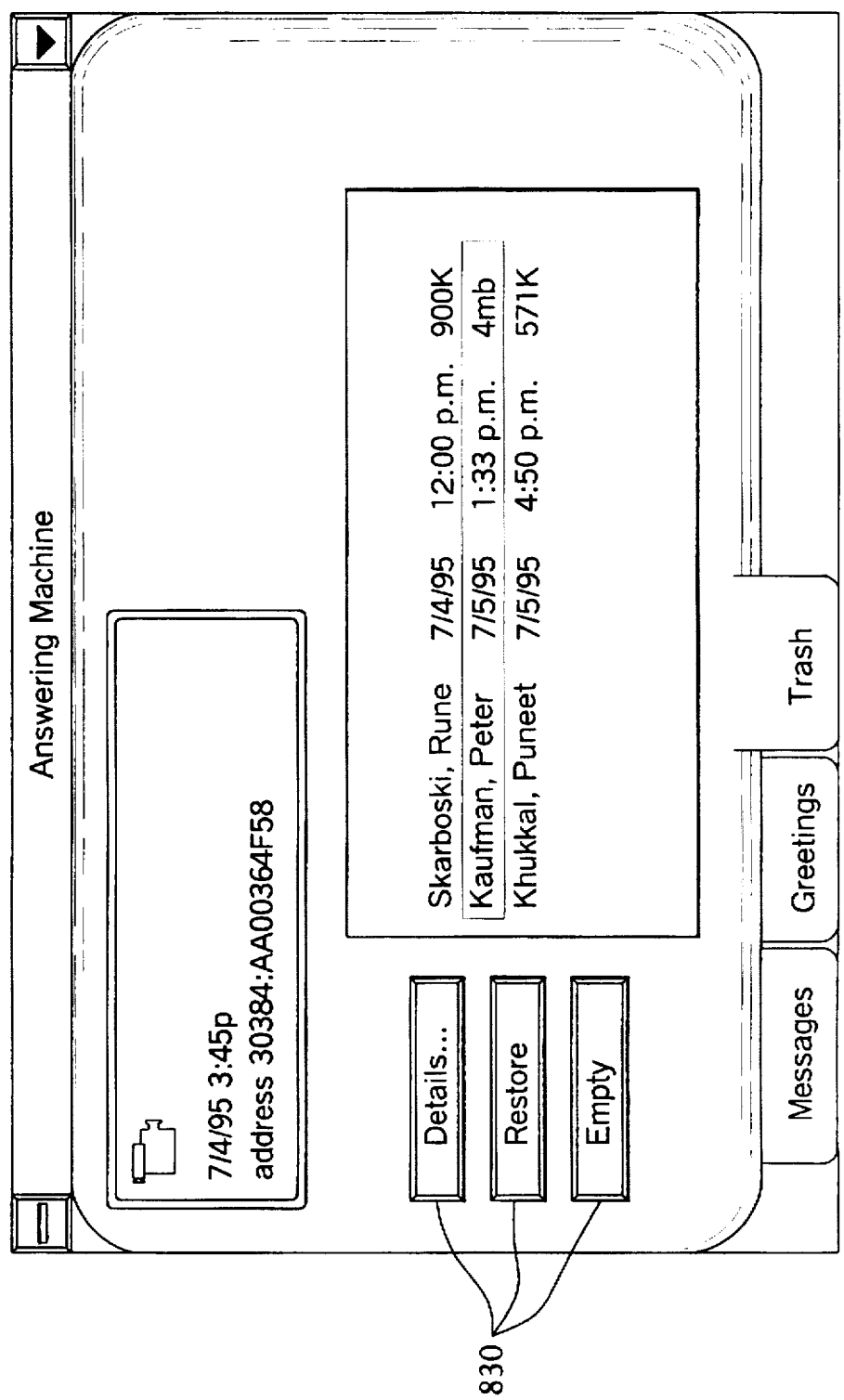
FIG. 8 shows the playback dialog window of FIG. 6 in display trash state.

Referring now to FIG. 7, there is shown the "Playback" dialog window 600 of FIG. 6 in display greetings state. The greeting state allows the user to view existing greetings and create new greetings. The greeting state has the same "tracking" behavior as the message state. Referring now to FIG. 8, there is shown the "Playback" dialog window 600 of FIG. 6 in display trash state. The trash state shows all deleted greetings and messages. The lifetime of a deleted item is determined by user-defined preferences.

Figure 9:
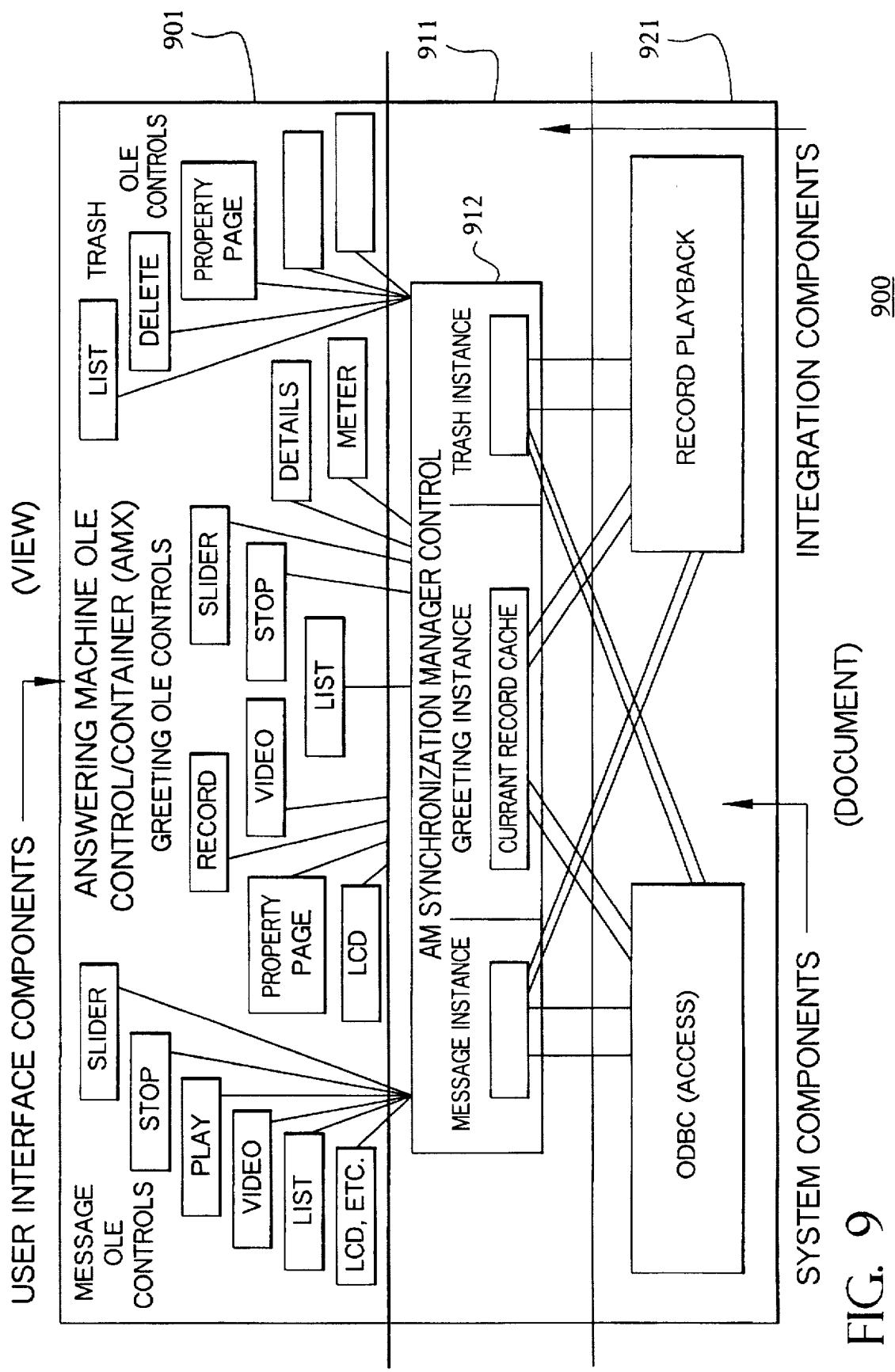
FIG. 9 shows a block diagram of the AM object linking and embedding control.

Referring now to FIG. 9, there is shown a block diagram of the answering machine object linking and embedding control 900. As will be understood, most applications internal architecture may be viewed as an hourglass, wherein the UI is at the top, connectivity is in the middle, and the operating system and related components are at the bottom. As shown in FIG. 9, UI functions 901 are spread about at the top; connectivity 911 between UI 901 and system 921 shrinks in the middle, and system 921 spreads out at the bottom. In the AMX OLE control 900 illustrated in FIG. 9, the AMX control contains "slave" OLE controls and AMX supports the controls' outgoing standard event and ambient property interfaces (not shown). The lines that are shown connect the boxes are automation interfaces. These are only used when the controls are registered with the Synchronization Manager control 912. The controls and Synchronization Manager 912 establish a two way communication. If a control is registered with Synchronization Manager 912, Synchronization Manager 912 will inform the control of events like a message selection change, as will be understood by those skilled in the art. The control will react to this notification in the appropriate way for that event, for example updating its view to show the newly selected message.

AMX 901 is an OLE control that creates, contains, and uses other OLE controls. AMX 901 is a container for other controls but is also a control itself. The "views" of the document are the graphical OLE controls like the slider control, the video window, the message listbox, and the like. The "document" is the AM Synchronization Manager and the two data sources, Access (message description database) and Record/Playback Services, all of which are OLE controls.

Internally to AMX, AMX creates three instances of the Synchronization Manager control, a "message" instance, a "greeting" instance, and a "trash" instance, retrieving each of their automation interfaces.

Next, the AMX creates all the "view" OLE controls for each Synchronization Manager instances. After a view is created, it is registered to its associated instance of the Synchronization Manager. Inside of the registration of the view, a two-way communication is established between the view and the Synchronization Manager by exchanging automation interfaces. Once the registration is complete, the view will automatically become active, thus updating its display to reflect the currently cached document record (i.e., implicit transactioning) associated with the Synchronization instance, as will be understood by those skilled in the art.

Synchronization Manager 912 can be visualized as behaving as a well written Windows message procedure. It "glues" the graphical controls, "views," to a data source. (As will be understood, "views" do not have to be OLE controls. A "view" can be any window that supports the Synchronization Manager proprietary interface.) Synchronization Manager 912 also keeps "track" of the current record, caches it, and notifies all views of the cached data. It also prevents reentrancy by a set of "rules," which are listed below:

(1) "View" controls are created and destroyed independently of Synchronization Manager 912. The Synchronization Manager will never create or destroy "view" controls. Usually the application utilizing the "views" create them.

(2) All "view" controls that wish to participate with the "document" must be registered with Synchronization Manager 912. Usually the entity that creates the instance of the control registers it with Synchronization Manager 912.

(3) To stop participation with the "document", "views" need to be unregistered.

(4) "View" controls can be registered and unregistered with the Synchronization Manager dynamically. If the "view" needs to display an interpretation of the current record of the document, then it needs to be registered with the Synchronization Manager. If the "view" does not need to reflect the current record then all that is required is for the "view" to be unregistered from the Synchronization Manager.

(5) "View" controls have no knowledge of other "view" controls. All inter-control communication goes through the Synchronization Manager. All "views" are siblings from the perspective of Synchronization Manager 912.

(6) All events from a control go to the Synchronization Manager. The Synchronization Manager will decipher and broadcast any needed information to all other controls except for the control that was the source of the event.

(7) All data sources must provide a means to allow the Synchronization Manager to supply a handler to be notified upon data source data change, i.e. record deletion, addition, update as well as data source creation, deletion, opening, closing, and the like.

(8) Controls can register with the Synchronization Manager as a standard "type" of control. For the control to be considered as a standard "type," it must implement an expected interface. Thus, if a control is registered as a "List" control, then it is expected to implement the "List" interface.

(9) All "view" controls, Synchronization Manager control, and data source controls must be able to operate independently.

AMX 901, as will be understood, is not only a control but is an OLE container for the OLE custom controls that it utilizes. Each of the "slave" controls can be used completely as an independent control in a control-aware container like Visual Basic 4.0. It is possible that the user of these controls may not want the behavior of the Synchronization Manger but yet would like to utilize the data source controls or view controls independently.

In communication between the graphical OLE controls and the Synchronization Manager, the graphical controls will be passed the Synchronization Manager's interface, via appropriate interfaces. The graphical controls may utilize an appropriate interface that will be passed to the Synchronization Manager so Synchronization Manager 912 can notify the controls of events.

When the AM application is created, the application creates an instance of the AM OLE custom controls described above. The application will then position the AM controls in its client area. Through the AM controls' methods, the container can create, position, and show AM "features". These "features" are packaged as OLE custom controls and the AM custom controls act as their container. Some "features" include the slider control, the playback video frame control, the message listbox control, the play button control, the stop button control, the volume button control, the delete button, the details button, the property sheet, and the like, for example as illustrated in FIGS. 6–8. As will be appreciated, all the UI in FIG. 6 are "features" and are mapped to methods in the AM OLE control.

As will be understood, all interface components may be written as OLE custom controls. For example, an OLE control container may be utilized for a Message/Greeting/Trash property sheet. With this OLE control container, property sheets and property pages are the starting source. The container of the property sheet control can create a message page, greeting page, and/or trash page. Each page of the property sheet is also a container for other OLE controls.

For the Message Listbox Control (e.g., message listbox 607 of FIG. 6), messages that have been read have a visual indicator similar to a check mark to show status, and messages that have not been read have no check mark. Each message has an icon associated with it when selected indicating what type of media the message consists of, such as audio only, audio/video, and/or text. The messages listed are, in one embodiment, sorted by most recent. Messages can be deleted, for example by using a "Del" key on the user's keyboard. Such deleted messages are automatically added to the user's Trash list. By double clicking on a message, the message will either start to play or the sender of the message will be called, depending on user preferences. The message list will be populated by accessing message data stored in the AM database, as will be understood.

For the Greeting Listbox Control, such as illustrated in FIG. 7, the greeting listbox control contains a list of recorded greetings. A small number of pre-recorded greetings may be built in for selection by the user. These "canned" recordings may present, for instance, a professional secretary giving a set of typical greetings. Greetings may be sorted according to any convenient rule, such as alphabetically by caption or title of the greeting. Greetings can be deleted, e.g. by the Del key, and are automatically added to the Trash list. An inline editing feature may be utilized to allow the user to change Greeting descriptions or individuals' names. After the user has recorded a greeting, the user can select save. In response to this selection, a dialog will appear to ask the user if it is a new greeting or if the user wants to overwrite the currently selected greeting. If the user selects "New" then space is made in the greeting list and an edit box is inserted with the focus set to it. The user can then type in a description for that greeting. The greeting list may be populated by retrieving the greeting data from the AM database.

For the Trash Listbox Control, such as illustrated in FIG. 8. Messages and Greetings that have been deleted will be placed in the Trash list, as explained above. To undelete any item in the list, the user may select the item(s) and pressed the undelete button on the property page below the listbox and the undeleted Message or Greeting will be placed in the list. Deleted items are sorted by most recent item deleted, in one embodiment. The trash list is populated by retrieving the trash data from the AM database.

Referring once more to FIG. 7, viewer control 705 is utilized in the greetings mode of dialog 600. Viewer 705 may be, for instance, a (160×120) pixel window within dialog 600. The viewer control provides the following functions or modes: It records local AV into a file; provides for Playback of an AV file; provides a text message editor, a text greeting editor, a text message viewer (read only), a text greeting viewer (read only); and displays a bitmap. The viewer has a volume control property that directs the view to show a volume control (as illustrated by the button labeled "Vol") and Volume status 707 as part of the frame when in an AV mode. The disk usage meter control 708 of FIG. 7 displays the available disk space. The volume control may be utilized to capture mouse click events, and to send such a "volume event" to its container and to Synchronization Manager 912 if registered. Message Number Panel Control 709 shows the current message as a simulated so-called liquid crystal display ("LCD"), and also supports two mouse capture events: Next Message (right side), which sends a NextMessage event to its container and to synchronization manager 912 if registered; and Previous Message (left side), which sends a PrevMessage event to its container and to synchronization manager 912 if registered.

The AV Button Control (containing the REC, Play, Stop, and Save buttons, as illustrated in FIG. 7), comprises these four button styles. REC Sends a Rec event to its container and to synchronization manager 912 if registered. Stop sends a Stop event to its container and to synchronization manager 912 if registered. Play sends a Play event to its container and to synchronization manager 912 if registered. Save sends a Save event to its container and to synchronization manager 912 if registered.

Message/Greeting LCD Status control may be illustrated in message mode 620 of FIG. 6 or in greeting mode 720 of FIG. 7. This control shows the status of the currently selected greeting or message, and is read only. It retrieves information from Synchronization Manager 912 when notified of a selection change by the Synchronization Manager.

Command Button Controls are those such as the buttons 630 of FIG. 6, 730 of FIG. 7, and 830 of FIG. 8, and are used to send events to the respective container as a result of user interaction. The Synchronization Manager Control 912 illustrated in FIG. 9 encapsulates the behavioral linking of the above components with the Message/Greeting Browser database and the Record/Playback system.

The Message/Greeting/Trash Database Control allows messages to be associated with certain individuals and individuals to be associated with greetings.

Referring once more to FIG. 2, incoming call dialog 200 is illustrated. As will be appreciated, this dialog is displayed by the Conference Manager ("CM") when an incoming call is detected and the AM is available. If the AM is not available for some reason, the Take a Message button will be disabled. As shown in FIG. 2, dialog 200 contains several Incoming Call Status Panel Commands: Accept; Decline; and Take a Message. For the Take a Message button, since AM is a local server (i.e., OLE2 terminology for an executable application), the CM may make a function call such as CoCreateInstance ( ), and the CM gets the AM interface via a function call such as QueryInterface. The CM passes the CallerInfo object to AM via an interface. As will be understood, the object may be various types of data, such as a "business card" or profile containing a set of data describing the caller; or information concerning the characteristics of the caller endpoint, whether the caller has an AM that may be invoked, what type of video and audio stream formats the caller is using so that the callee's AM can play back an AV greeting in the correct format, and the like. At this point AM is now in Greeting Server mode. After a predefined number of rings, and if the CM's auto answer option is set to TRUE, then the CM will behave as if the user clicked the "Take a Message" button on the "Incoming Call Status Panel".

With respect to the CM, the CM serves as the conference node controller (a GCC term, as will be appreciated by those skilled in the art), integrating all other conferencing applications under a common user interface. The CM also brings multipoint conference chair control and roster capabilities to the user. Conferencing applications that are compatible with the CM are themselves OLE-enabled and avail themselves of CM services through an application interface. Third party conference applications can also access CM services through an interface, or may access lower-layer services directly through their respective interfaces.

Figure 16:
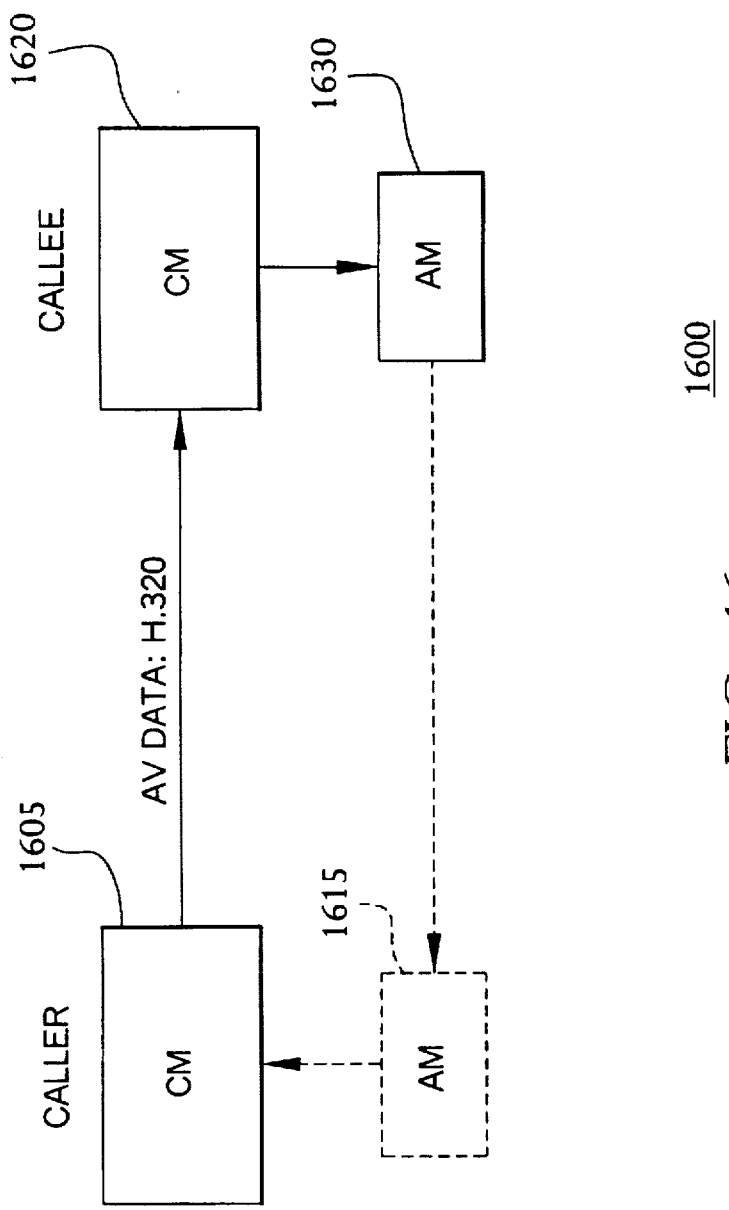
FIG. 16 illustrates a virtual AM provided by the callee's AM to a caller that does not have an AM.

Referring once more to FIG. 3, there is illustrated Callee Greeting Server 300. The Callee Greeting Server's purpose is to send a Greeting to the caller via a previously established connection. The establishing of AM services proceeds in the following fashion. First, the CM of the callee is operating. The callee's AM is either already running or is available to be invoked by the callee's AM if necessary. When the caller's call is not answered for the predetermined amount of time or number of rings, the callee's CM invokes the callee's AM, unless it is already running. Thus, the callee's CM accepts the call and hands it off to the callee's AM. If the computer system of the caller has an AM, then via the already-established conference connection, the callee's AM enrolls in a GCC conference with the caller's AM (which causes the caller's AM to be invoked if necessary). Thus, there is a conference established between the caller's and callee's AMs. One benefit of having the caller's AM invoked is that a UI may be presented to the caller, allowing various services to be utilized, such as leaving an attachment. When the caller chooses to record an AV message, for instance, the AV of the caller's message is received and recorded in real time by the callee's AM. If the caller does not have an AM, AM services may nevertheless be provided, as described hereinbelow with reference to FIG. 16.

At the point where incoming call dialog 200 is presented by the callee's CM to the callee, the callee has the option to: "Accept" the call, in which the callee's CM will establish a data conferencing connection; "Decline" the call, in which case CM will hang up the connection; or do nothing and let the CM answer and invoke the AM to provide the caller with AM services, as described hereinabove. As will be understood, the View Control reflects the outgoing greeting whether the greeting is text or AV. Also, the Callee Greeting Server is a COM interface and is initially activated by the CM. CM makes a CoCreateInstance ( ) AM function call.

calls QueryInterface ( ) to get the Callee Greeting Server interface, and then calls the method SetConnectionEnvironment ( ). SetConnectioninterface ( ) takes a Caller Information Object which is constructed by CM, as will be understood by those skilled in the art. The Caller Information Object is described above. All controls are OLE controls, thus making this dialog a container.

Referring once more to FIG. 4, there is shown an AV greeting dialog 400 which is presented to a user by the callee's AM. The associated Caller Greeting Player/Message Server displays this dialog 400 on the caller's side from AM when the callee's AM sends a greeting. This dialog steps the user through the process of viewing the greeting and the leaving of a message. Dialog 400 is a container utilizing existing OLE controls. The following steps illustrate the steps a caller will go through to leave a message in accordance with the AM. First, the caller is presented an AV greeting from the caller's AM, such as AV greeting dialog 400. If the caller does not have AV capabilities or the greeting is a text greeting, then the Caller Server will inform the Viewer control to show the text greeting. If the greeting is text then an additional button will appear called "Leave Message" (not shown) that the user will push when the user is finished reading the greeting and is ready to leave a message.

Figure 10:
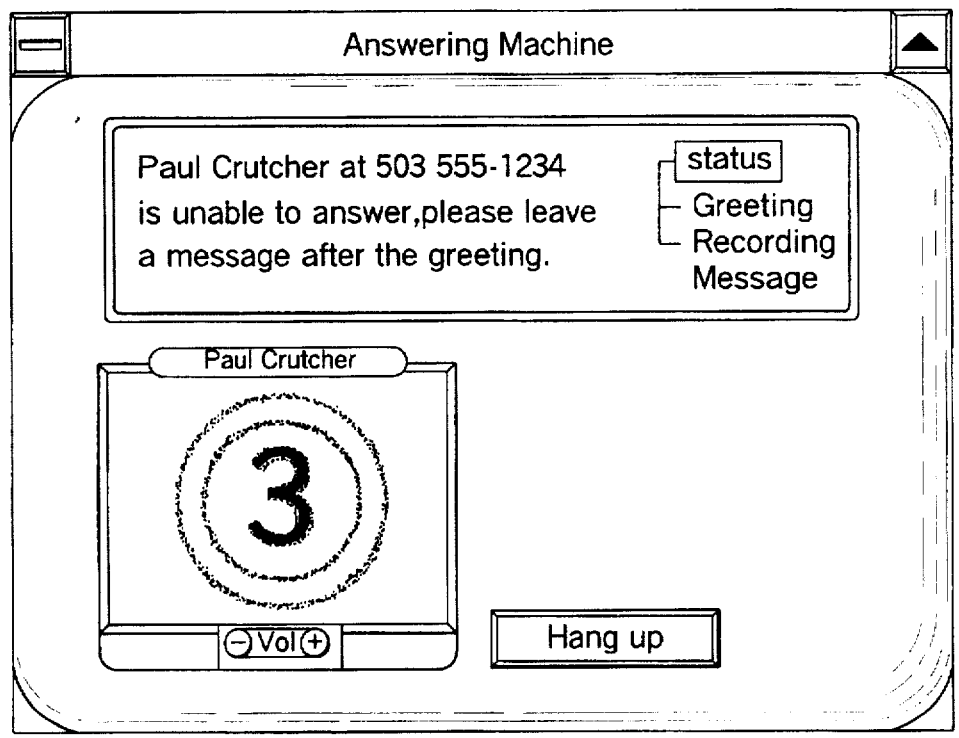
FIG. 10 shows a second AV greeting dialog that is presented to a user by the callee's AM.
Figure 11:
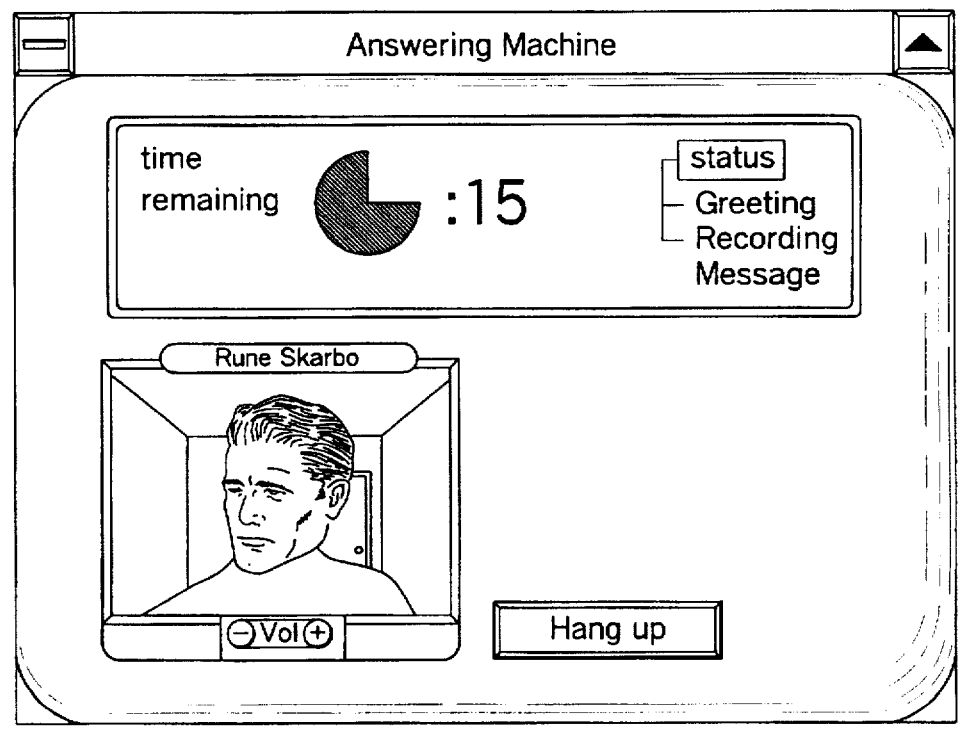
FIG. 11 shows a third AV greeting dialog that is presented to a user by the callee's AM.
Figure 12:
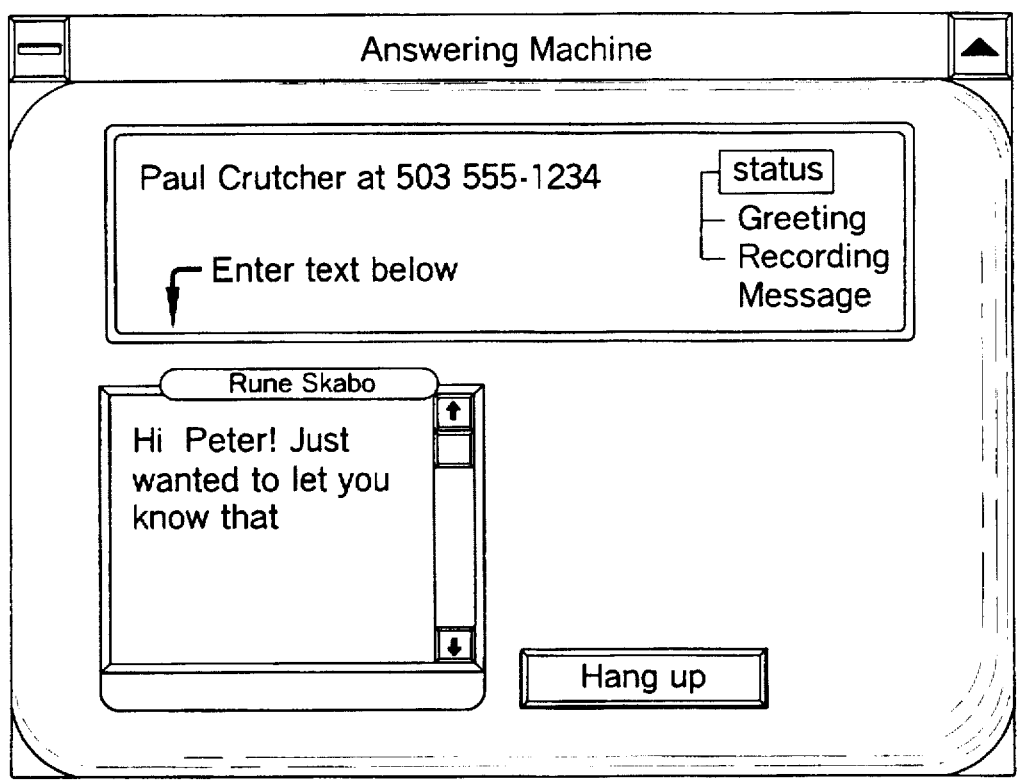
FIG. 12 shows a non-AV interface dialog that is presented to the caller.

Referring now to FIG. 10, there is shown a second AV greeting dialog 1000, which is also presented to a user by the callee's AM. This dialog informs the user that the greeting is done and to prepare to leave an AV message. If the greeting is text, then this dialog will not appear. Referring now to FIG. 11, there is shown a third AV greeting dialog 1100, which is also presented to a user by the callee's AM. In the third step, the AV message is sent to the callee. This dialog will only appear if the caller and the callee have AV capabilities. If AV is not allowed then the interface illustrated in FIG. 12 is presented to the caller.

Figure 13:
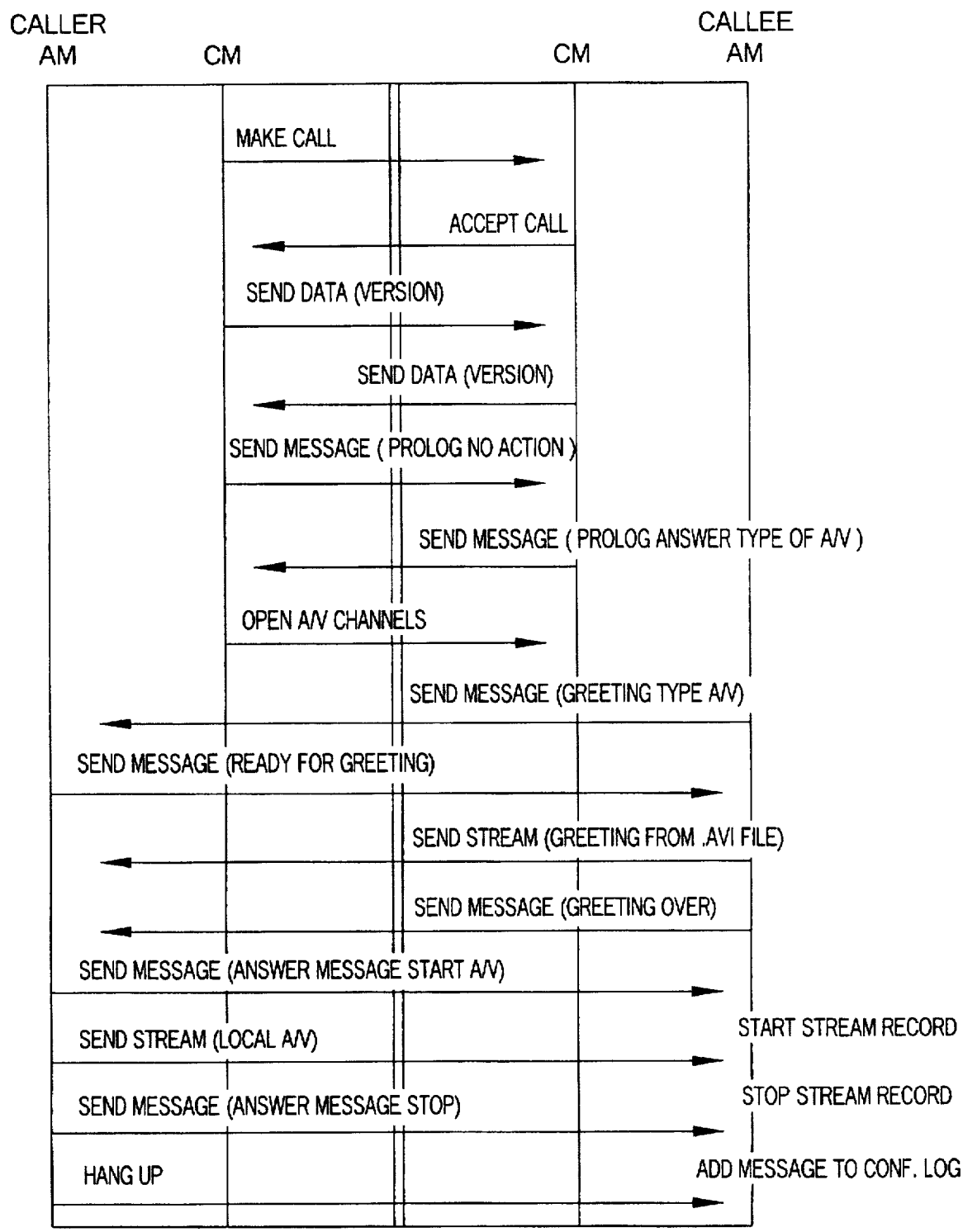
FIGS. 13 and 14 are railroad diagrams illustrating the data flow between the caller's and callee's AMs.
Figure 14:
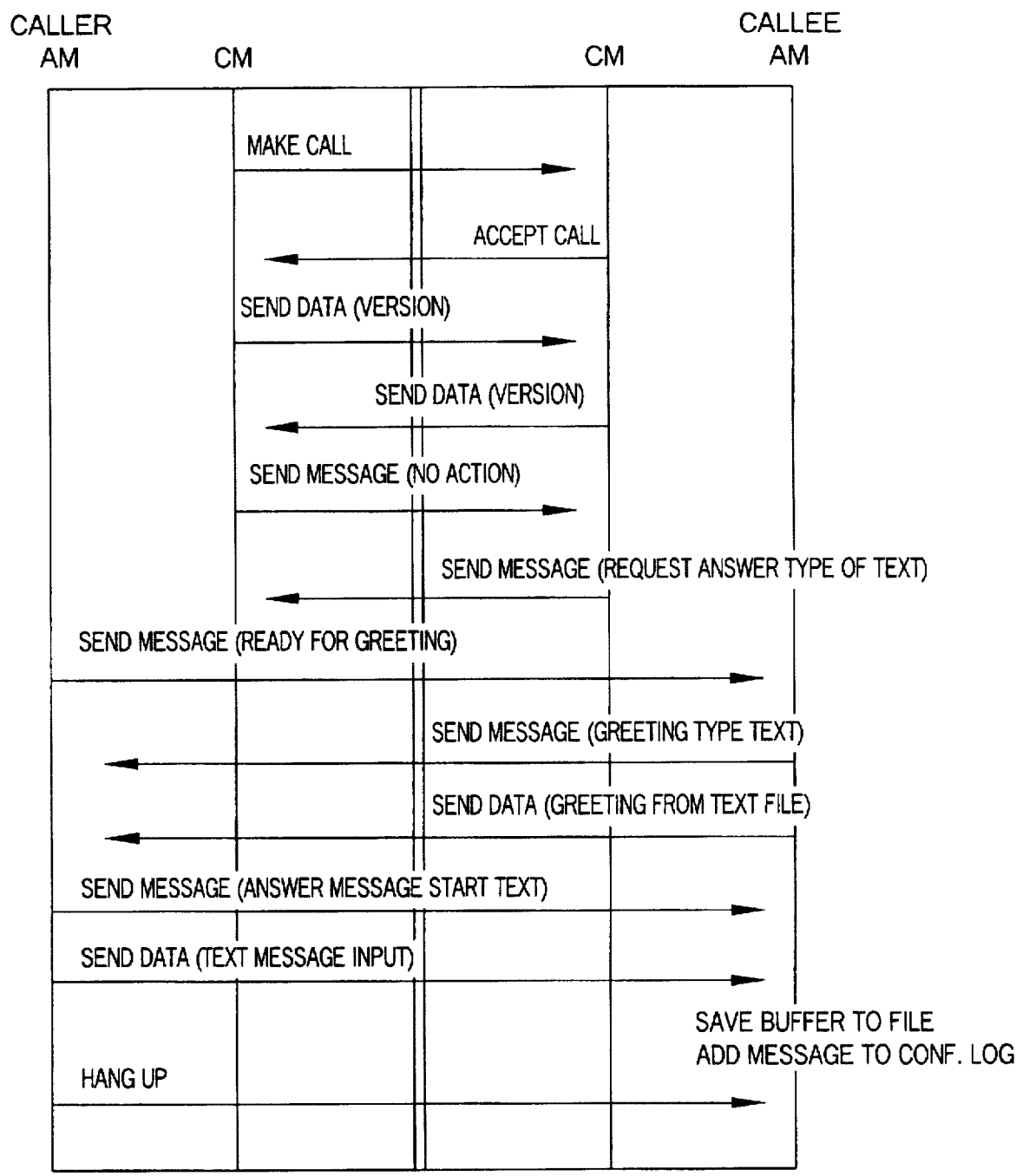

Referring now to FIGS. 13 and 14, there are shown railroad diagrams 1300 and 1400 illustrating the data flow between the caller's and callee's AMs that may be utilized in one embodiment of the present invention. These diagrams show possible data flow from the AM and CM components of the caller and callee. As will be understood, the diagrams are used to identify potential new messages and the flow of AV streams and data required to support the answering machine component. Diagram 1300 illustrates data flow for an AV greeting/AV answer. Diagram 1400 illustrates data flow for a text greeting/text answer.

As will be understood, in alternative embodiments, the greetings displayed to a caller may be personalized based on the caller's identification ("ID") if caller ID is implemented. Additionally, in some embodiments the AM may support the ability of the callee to preselect different greetings for different time of day and/or day of the week. Also, AM may allow a caller leaving a message to leave attachments attached to the message left (e.g., "Nathaniel, Too bad I couldn't reach you. Please review the attached drawings and we'll review them later.—Ayn Rand.").

Answering Machine Structure

Figure 15:
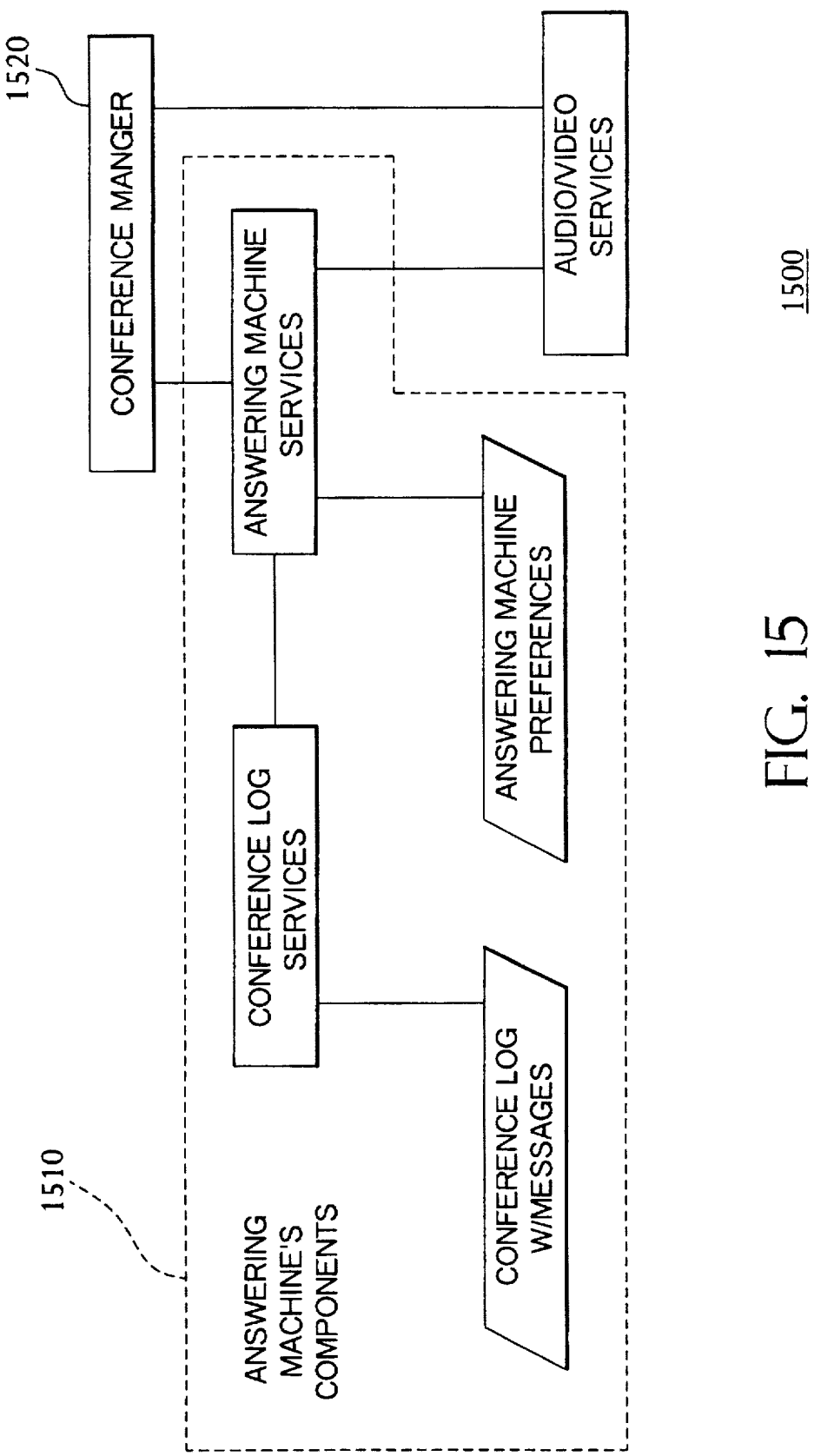
FIG. 15 is a block diagram of the AM architecture.

Referring now to FIG. 15, there is shown a block diagram of the answering machine architecture. As described hereinabove, AM 1510 may be configured for text- or AV-based services. The text answering machine allows the user to specify a text greeting to be displayed on the caller's machine. The caller may then enter a text message that is transmitted to and stored in the callee's message list. The AV AM allows the user to record and AV greeting to be played back on the caller's machine. The caller may leave an AV message that is transmitted to and stored in the callee's message list.

The AM configuration or setup allows the user to:

Enter, name, and store several greetings for different situations (e.g., in office but away from desk, out of town, or working at home today) that may be accessed later;

Specify how long to wait before the answering machine picks up the call (e.g., four rings); and Specify whether to use text or audio/video.

These preferences may be stored in a file, as will be understood.

Thus, AM manifests itself to the user as:

A set of preferences;

A new way to handle incoming calls;

A greeting and an option to leave a message;

Answering machine messages in the message list; and

An indicator in the Conference Manager of new (i.e., unread) messages.

As will be understood, AM in one embodiment utilizes the generic conference control ("GCC") standard (where GCC is a well-known standard defined by the ITU) for transferring non-AV data, H.320 for transferring AV data, and uses AV conferencing services ("AVCS") to launch and communicate with its peer. The mechanism for recording an AV message is similar to that used to record an AV stream during a data conference. As will be appreciated by those skilled in the art, the ITU defines various industry standard layers for use in data conferencing and other applications, such as T.120 layers including T.122/T.125 MCS (Multipoint Communication Service) and T.124 GCC (Generic Conference Control) layers. These standards may be utilized for implementing multipoint conference control and for providing a common data conference infrastructure.

AM is invoked by CM 1520 if (1) the user (on the callee side) has enabled the AM and (2) the number of rings specified by the user (on the callee side) has elapsed without the user answering the call. In this case, the following occurs:

1. CM 1520 accepts the call and checks for compatibility (since the call may originate from a system not having an AM).

2. If compatible, CM 1520 invokes AM. When AM is invoked, it behaves like other GCC conference applications such as Notebook or Application Sharing type applications.

3. The AM registers with GCC, enrolls in the conference, invokes its peer, exchanges data (i.e., greetings and messages), and leaves the conference when the message has been transferred or the user (callee) manually interrupts the answering machine.

4. When AM on the callee side has received the message, it deposits the message in the message list using message list services. AV messages are stored in .AVI file format and played back using AVCS.

As will be understood, the above is invisible to the application that uses answering machine services (e.g., CM 1520). The AM provides a functions for being invoked and interrupted, as described hereinabove. AM may be invoked by CM 1520 when a sufficient number of rings have occurred without the user answering the call, as previously described. Greetings are presented and messages recorded and stored in the message list as a result of calling this function. The call is asynchronous and various status messages are passed up to CM 1520. AM may be interrupted any time after being invoked and before receiving a "Done" callback message.

As will be appreciated, the present AM invention may be implemented on both users (caller and callee) of a data conferencing system, such as the Intel® Proshare™ conferencing system, using standards such as the H.320 standard, T.12x, GCC, and MCS. Thus, when the caller calls the callee, the callee's CM answers the call and invokes the callee's AM, which causes the caller's AM, in conference with the callee's AM, to provide AM services for the caller. As will be appreciated, in general the caller and callee need only have compatible data conferencing systems implementing an AM application having the functions described herein. However, the present invention may also function even if the caller is not configured to provide AM services, or even if the caller does not have a CM per se.

When a conference is established between the caller and the callee's CM, the callee's CM is provided with sufficient information to enable the communication of various forms of data across the communication channel. Thus, the callee's system is able to send and receive various forms of data to and from the caller, even if the caller does not have an AM or related systems. In this case, the callee's AM may still provide AM services, as illustrated in the data conference 1600 of FIG. 16. Thus, in this case the callee's CM 1620 receives an incoming data conference call from a caller using a data conferencing system that does not support an AM. As will be appreciated, when data conferencing manager 1620 receives the incoming call from the caller, through normal handshaking and other identification techniques (such as those specified in the ITU H.320 specifications), callee CM 1620 is able to determine whether or not the caller's data conferencing system supports an AM compatible with the AM of the callee. If not, then AM 1630 of the callee may provide what appears to the caller to be a virtual AM 1615 with which the caller may leave a message as described previously. As will be understood, AV communications may be conducted utilizing high-level protocols such as the H.320 family of standards, GCC, MCS, and the like. In such a virtual AM system, there is a conference established between the callee's AM 1630 and the caller, so that as the caller generates an AV or other type of message, this information is available through the conference at AM 1630 and is recorded as a message as specified hereinabove.

In other embodiments of the AM, the following features are provided. During the establishing of a conference, the caller's CM may pass a "business card" or profile containing a set of data describing the caller to the callee's CM. This business card, in turn, may be passed to the callee's AM when invoked. In this manner often a caller or callee will have on file the business card of several other users with whom there has previously been communication. Often a caller attempting to place a data conferencing call is unable to do so for a variety of reasons, for instance, a conference connection is unable to be established because the callee's system is down. Alternatively, a callee not answering the call may not have an AM or the callee's AM may be disabled. In either case the caller is unable to leave a message. The present invention, in one embodiment provides a means for attempting to circumvent this problem. First, the caller's AM or CM, after realizing that a message cannot be left for the intended callee, determines whether it already has information concerning the callee, such as the callee's "business card." This business card may contain further information concerning alternative ways of contacting the callee, such as fax, beeper, telephone, email, and the like. In one embodiment, the callee's AM automatically selects an option or a plurality of possible alternative communication options, and contacts a third party intermediary capable of attempting to further contact the callee utilizing one or more of the alternative methods of communication. At this point the AM is no longer involved, but the third party intermediary may then interface with the caller to notify the caller of the communication attempted, to allow the caller to select options, and the like, as will be understood. This may serve to reduce the frustration or inefficiency faced when AM services are unable to be utilized.

In a further embodiment, the third party intermediary may supply its own version of an AM and conference with the caller's AM and allow a message to be left as described hereinabove. The third party intermediary would then undertake to periodically re-establish a connection with the callee, and either display the message for the callee, if the callee answers, or leave the message on the callee's own AM if and when the callee's AM answers the call from the third party intermediary. Subsequently, the third party intermediary may contact the caller's system and notify the caller of success or failure in the attempt. As will be understood, such third party intermediary services may also be integrated into and internalized with a user's own AM application. For instance, the user's AM may, if a conference attempt fails, offer the user the option of leaving a message local to the caller which the caller's AM automatically attempts to leave with the callee's AM at periodic intervals. In a further embodiment, the caller's CM may also comprise these options.

In another embodiment, instead of requiring the user to interface with a plurality of message lists, such as the AM message list described herein, the user's email message list, and the like, the AM provides a "hook" feature that automatically links each message in the user's AM message list with a primary message list (e.g., the email message list). Thus, the user may see within a unified list unread email messages as well as unread AV messages recorded by the AM, and may easily access any such unread messages.

Capture and Playback of AV Streams in Data Conference

The present invention further provides a method to record AV in a data conferencing system and to play back captured AV either locally or remotely. The following scenario is described for illustrative purposes. Assume that three users A, B, and C, have installed a conferencing system that allows any or all of the three users to data conference with one another. Assume that A and B are currently conferencing. During this conference, user A records something that B says, does, or transmits. Thus, both the audio and video are recorded (e.g., to an AVI (audio/video interlaced) file or to any other suitable AV file format). Later, user A may play back the recording on his machine. Alternatively, user A may also play this recording back for other conferees in a conference. For example, A can data conference call C and play back the recorded AV data for C to see and hear. A may also play back the AV clip to all participants in a multipoint conference.

Thus, in accordance with the present invention, a participant in a data conference may record AV streams of the conference, and may play back the recorded AV stream in a conference, both point-to-point and multipoint. In one embodiment, the user whose AV information is being recorded is presented with an indicator notifying him of this, to prevent another user from secretly recording him. Also, during recording, the recording user's UI presents status information concerning how much disk or other storage space is currently remaining for storing such data, and also provides information about the recording made so far, such as its duration. Preferably, the recording automatically ceases if remaining storage space becomes too depleted.

Indices may be added to the AVI stream for easy search and retrieval, as will be understood. One such indexing method is taught in the U.S. Patent Application entitled "Apparatus and Method for Temporal Indexing of Multiple Audio, Video, and Data Streams," filed Dec. 21, 1995, inventors Rama R. Prasad and Ram V. Chary, the entirety of which is incorporated herein. Thus, the present invention enables the user to play back an entire presentation, including slides and AV shown by the presenter, that the user saw during a data conference, to other users in a separate, later data conference. Further details of the present record and playback services are discussed below.

A conferencing system such as illustrated in FIG. 1 typically allows for the display and transfer of live data in or out of a conference. A recording of a portion or all of the streams of such a data conference could include, for example, the video image of either the local or a remote source, and all the audio sources. For example, if five users are participating in a conference and one user if the primary speaker, a recording could capture the audio and video streams for that primary user, and also all the other audio streams of the other four users, who, for example, may make various comments or suggestions during the conference. Such stored AV may also be played back locally or remotely during a conference, to allow the AV to be presented to the remote conference participants.

In an embodiment of the present invention, playback of a recorded video clip will replace the playback of the captured video in the local video window. The user can select whether to send this recorded file to the remote site (although, as will be understood, this option is available only during a conference). The user can select a section of a recorded video clip for playback. As such, the users may advance through a recorded video clip on a frame-by-frame basis, marking the beginning and end of the section. The user may also move backwards or forwards through the recorded AV clip. Additionally, the user may select to play recorded video clips back in a continuous mode. When playback has reached the end of the clip, it resumes at the beginning of the clip. This feature may be useful, for example, for clips of very short duration. Similar features may operate with respect to the playback of a selection of a clip. The user is also provided with the ability to "quick play" to the local video stream. With this feature, the user may press a button on a video window, which prompts the user to play a recorded AV file.

As explained above, the user may record any portion of a conference call, including the local or remote AV streams. Although the recording has no effect on the conference, remote participants whose AV streams are being recorded receive a notification of such and an indicator that lasts for the duration of the recording as a constant reminder to the users being recorded. The recording user, in an embodiment, also displays an indication that recording is taking place, as a reminder to the recording user. Users are provided with the ability to "quick record" any given AV stream, by pressing a button on a video window, which will then begin appending to the currently opened record file (or will open one and begin recording, if none is opened already).

Users may also disallow being remotely recorded or be prompted before allowing remote recording to proceed. A user may also specify limits with respect to such a conference recording. For instance, the limits may be specified in either time, space, minimum space remaining, or some combination of these factors.

Figure 17:
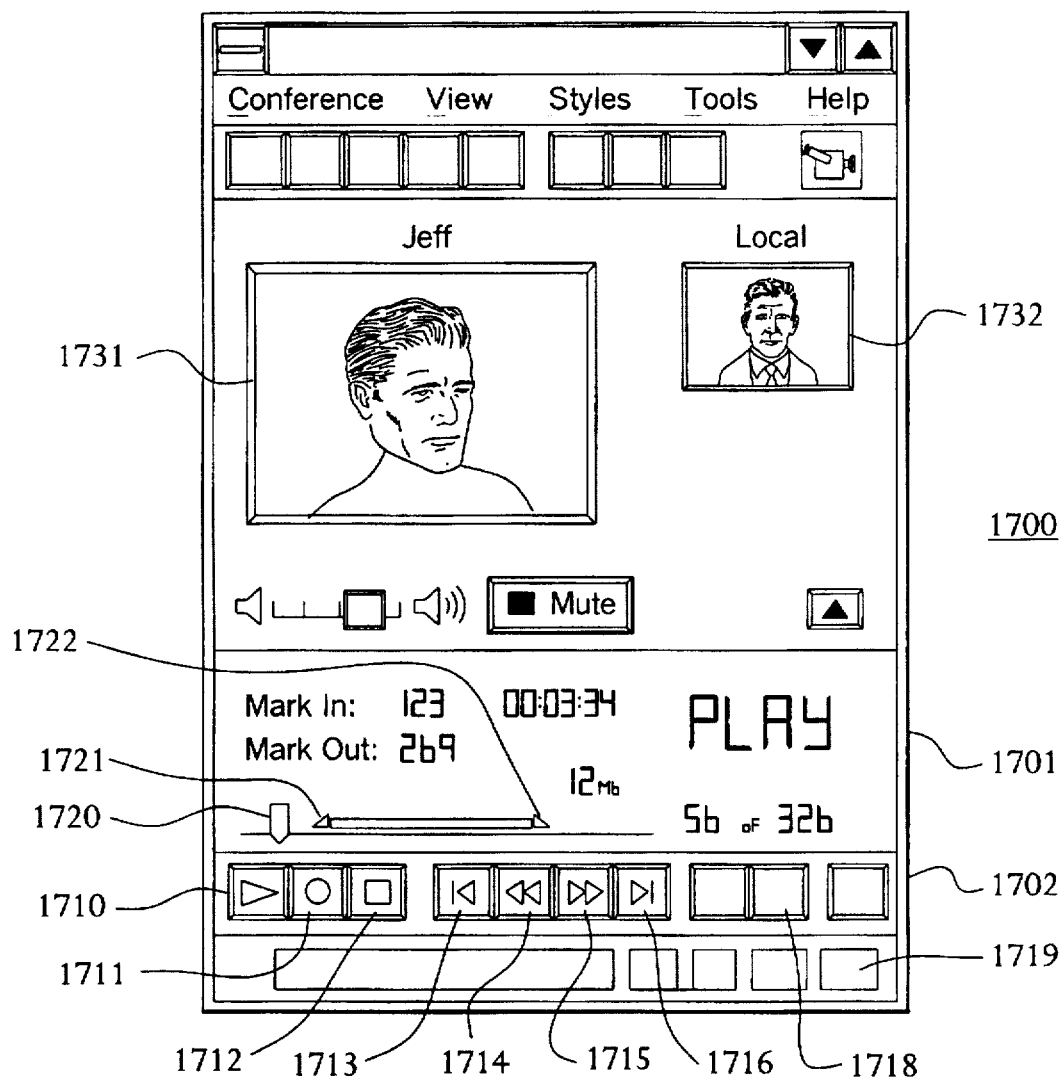
FIG. 17 shows a record and playback services dialog panel window.

Referring now to FIG. 17, there is shown a record and playback services dialog panel window 1700. Panel window 1700 comprises panel 1702, which may be activated by depressing an appropriate "Record/Playback" button in an overarching application such as the Conference Manager described hereinabove. The panel itself appears as panel 1702 below the video window section 1701, which displays local video data and the currently selected or active remote participant's video stream. Video window section 1701 may also display played back video data. Panel 1702 controls all aspects of recording and playing back audio and video during a conference.

To play back a recorded video clip, the user first selects a file that has already been recorded. This is done by clicking a "File/Open" toolbar button in the record playback panel, as will be appreciated. This in turn brings up an Open File common dialog box. This dialog box can, optionally, show the first frame of the AVI file. The user then selects a file for playback. Next, the user depresses the "Play" button 1710. This causes the recorded video clip to play in the local video window, replacing the local video stream. If the user is in a conference, the user may, optionally, specify to send the recorded AV clip to one or more remote participants, by activating an appropriate button such as a "Send" button 1718. The "Stop" button 1712 may be clicked when the user is done playing the recorded video clip. The slider control 1720 may be utilized to easily select any position within the clip or to quickly browse through the clip. The rewind button 1714, retreat button 1713, advance button 1716, and fast forward button 1715 may also be utilized for this purpose. Play may then be depressed to play from the current frame of the video clip.

Figure 18:
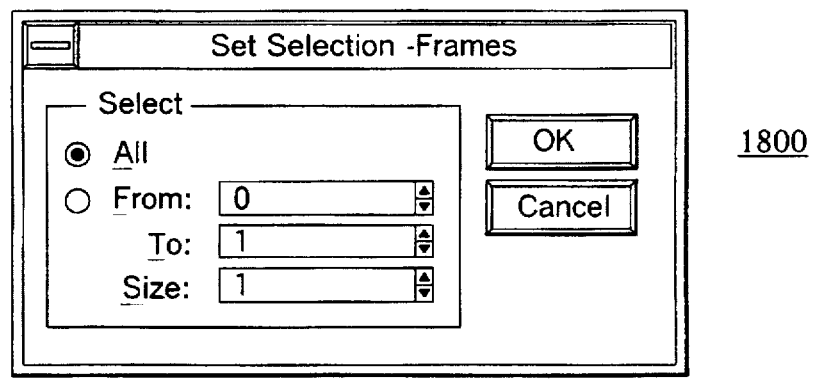
FIG. 18 shows a select frames dialog for use in combination with the record and playback services dialog panel window of FIG. 17.

To select a section of a recorded video clip for playback, the user grabs beginning and end markers 1721 and 1722 and moves them to the desired location within the clip. As these markers are slided back and forth, window 1731 displays the video frame of the recorded video clip for that time location. Setting the markers in the manner also, in one embodiment, causes the "thumb" of slider control 1720 to be moved to the nearest marker so that the slider control works within the selection of the clip. Alternatively, the markers 1721, 1722 may be set using a dialog box that is accessible from an Edit/Set Selection menu, as illustrated by Select frames dialog 1800 of FIG. 18. The "All" toggle is the default setting, which selects all frames for playback. Thus, the "selection" is the entire clip. Alternatively, the "From/To/Size" toggle may also be selected to select a subset or selection of the video clip for playback. Any two of the "From/To/Size" parameters may be specified to define the selection, in terms of frame number and number of frames. Alternatively, these parameters may be expressed in seconds in either absolute time or in relative time for the conference or the recorded clip. Thus, a user may select to playback from frame 100 to frame 250 (having an automatically calculated size of 150); or may select to play for a Size of 10 seconds up "To" time 5 minutes of the clip (thus making the From time be 4:50 from the beginning of the clip).

During playback of a clip or selection thereof, the Slider thumb 1720 is updated to move in accordance with the progress of the frames being played. During playback, the user may move the current position using any of the above-described methods, which allows the user to quickly go backwards or forwards to see certain parts of a recorded video clip. To play a recorded video clip continuously, the user toggles a "Continuous Play" button 1719, which toggles continuous play on or off.

To record a conference or portion thereof the user clicks the Record button 1711. This action starts the recording of whichever video stream is currently selected for recording.

To change the selection, the user may press either a "Local" or "Remote" button, which are mutually exclusive buttons so that only one may be selected at a time. Pressing the "Local" button causes the local video 1732 as captured, for example, by the user's own video camera, to be recorded, while selecting "Remote" causes the video stream from a remote user (typically appearing in window 1731) to be recorded. After pressing the Record button, the selected stream is saved into an untitled file, and the user may stop and start recording selectively, at any time, by depressing the appropriate buttons (for instance, the "Stop" button). While recording, a meter displays the amount of space and/or time used relative to any constraints chosen by the user in the preferences, or a default set of constraints. These preferences specify, for instance, how much to record in terms of time and/or storage space, how much space to leave on the storage media, or some combination of these or similar factors. While recording, the user may switch between the local and remote video streams at any time. In the current example there are two video streams, local and remote, and at least two audio streams associated therewith. The audio of any video stream not being recorded may also be mixed into the audio portion of the record file, depending upon user-selectable preferences. Typically, a user will choose to records a single video stream at a time and all other audio streams extant in the conference. To save a recorded AV clip the user selects a File/Save toolbar button, as will be understood, and is prompted for a file name in a "Save As" common dialog box.

To avoid having a larger UI displayed to allow recording of a conference, a "Quick Record" button is provided. If a user presses this "Quick Record" button then the video immediately starts being recorded for the window that the Quick Record button is in. If there is already an open AVI file, then the recording may be automatically appended to this file. To stop the Quick Record the user may click the Quick Record button once more, thus toggling the record feature on and off. This button may appear in the video control panel for a given video window.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for receiving, with a callee of a data conferencing system, a data conferencing call from a caller of the data conferencing system, the method comprising the steps of:
   (a) answering the call with an answering means if the callee does not answer the call;
   (b) displaying a callee greeting to the caller to notify the caller that the callee is not answering the call; and
   (c) prompting the caller to leave a message with the callee; wherein:
   the answering means comprises a conference manager means for establishing a data conference between the caller and callee; and
   step (a) further comprises the steps of:
      (1) invoking, with the conference manager means, an answering machine means of the callee for controlling the displaying and prompting;
      (2) determining with the conference manager means whether the caller is able to invoke an answering machine means of the caller that is compatible with the answering machine means of the callee; and
      (3) establishing in accordance with the determination of step (a)(2), a conference between the answering machine means of the callee and the answering machine means of the caller, wherein the answering machine means of the callee and answering machine means of the caller control the displaying and prompting.

2. The method of claim 1, comprising the further step of:
   (d) if the caller decides to leave the message in response to the prompting, then receiving the message from the caller and storing the message in a callee message log to notify the callee that the message has been received.

3. The method of claim 1, wherein the callee greeting and the message comprise audio and video data.

4. The method of claim 1, wherein the message comprises a primary message and at least one attached file.

5. The method of claim 1, further comprising the steps of:
   (d) displaying an incoming call notification for the callee when the callee detects the call; and
   (e) providing a user of the callee with an option to answer the call or not.

6. The method of claim 1, further comprising the step of:
   (d) storing a plurality of callee greetings; wherein callee greetings are mapped to particular callers depending upon the identity of said particular callers; and
   step (b) comprises the further steps of:
      (1) determining the identity of the caller; and
      (2) selecting the callee greeting in accordance with the identity of the caller.

7. The method of claim 1, further comprising the step of:
   (d) establishing a data conference between the answering machine means of the callee and an answering machine means of the caller.

8. The method of claim 1, wherein step (a) comprises the further step of:
   (4) if the caller is not able to invoke an answering machine means of the caller that is compatible with the answering machine means of the callee, then controlling the displaying and prompting with the answering machine means of the callee.

9. An apparatus for receiving, with a callee of a data conferencing, a data conferencing call from a caller, the apparatus comprising:
   (a) answering means for answering the call if the callee does not answer the call;
   (b) means for displaying a callee greeting to the caller to notify the caller that the callee is not answering the call; and
   (c) means for prompting the caller to leave a message with the callee; wherein:
      the answering means comprises a conference manager means for establishing a data conference between the caller and callee; and
      the conference manager means further comprises:
         (1) means for invoking an answering machine means of the callee for controlling the displaying and prompting;
         (2) means for determining whether the caller is able to invoke an answering machine means of the caller that is compatible with the answering machine means of the callee; and
         (3) means for establishing, in accordance with the determination of means (2), a conference between the answering machine means of the callee and the answering machine means of the caller, wherein the answering machine means of the callee and answering machine means of the caller control the displaying and prompting.

10. The apparatus of claim 9, further comprising:
    (d) means for receiving the message from the caller and for storing the message in a callee message log to notify the callee that the message has been received, if the caller decides to leave the message in response to the prompting.

11. The apparatus of claim 9, wherein the callee greeting and the message comprise audio and video data.

12. The apparatus of claim 9, wherein the message comprises a primary message and at least one attached file.

13. The apparatus of claim 9, further comprising:
    (d) means for displaying an incoming call notification for the callee when the callee detects the call; and
    (e) means for providing a user of the callee with an option to answer the call or not.

14. The apparatus of claim 9, further comprising:
    (d) means for storing a plurality of callee greetings; wherein
    callee greetings are mapped to particular callers depending upon the identity of said particular callers; and
    means (b) further comprises:
       (1) means for determining the identity of the caller; and
       (2) means for selecting the callee greeting in accordance with the identity of the caller.

15. The apparatus of claim 9, further comprising:
    (d) means for establishing a data conference between the answering machine means of the callee and an answering machine means of the caller.

16. The apparatus of claim 9, wherein the answering machine of the callee means further comprises means for controlling the displaying and prompting if the caller is not able to invoke an answering machine means of the caller that is compatible with the answering machine means of the callee.

17. A storage medium encoded with machine-readable computer program code for receiving, with a callee of a data conferencing, a data conferencing call from a caller, the storage medium comprising:
    (a) means for causing an answering means of the callee to answer the call if the callee does not answer the call;
    (b) means for causing the callee to display a callee greeting to the caller to notify the caller that the callee is not answering the call; and
    (c) means for causing the callee to prompt the caller to leave a message with the callee; wherein:
       the answering means comprises a conference manager means for establishing a data conference between the caller and callee; and
       the conference manager means comprises:
          means for invoking an answering machine means of the callee for controlling the displaying and prompting;
          means for determining whether the caller is able to invoke an answering machine means of the caller that is compatible with the answering machine means of the callee; and
          means for establishing, in accordance with said determination a conference between the answering machine means of the callee and the answering machine means of the caller, wherein the answering machine means of the callee and answering machine means of the caller control the displaying and prompting.

18. The storage medium of claim 17, further comprising:
    (d) means for causing the callee to receive the message from the caller and to store the message in a callee message log to notify the callee that the message has been received, if the caller decides to leave the message in response to the prompting.

19. The storage medium of claim 17, wherein the callee greeting and the message comprise audio and video data.

20. The storage medium of claim 17, wherein the message comprises a primary message and at least one attached file.

21. The storage medium of claim 17, further comprising:
    (d) means for causing the callee to display an incoming call notification when the callee detects the call; and
    (e) means for causing the callee to provide a user of the callee with an option to answer the call or not.

22. The storage medium of claim 17, further comprising:
    (d) means for causing the callee to store a plurality of callee greetings; wherein
    callee greetings are mapped to particular callers depending upon the identity of said particular callers; and
    means (b) further comprises:
       (1) means for causing the callee to determine the identity of the caller; and
       (2) means for causing the callee to select the callee greeting in accordance with the identity of the caller.

23. The storage medium of claim 17, further comprising:
    (d) means for causing the conference manager means to establish a data conference between the answering machine means of the callee and an answering machine means of the caller.

24. The storage medium of claim 17, wherein, if the caller is not able to invoke an answering machine means of the caller that is compatible with the answering machine means of the callee, then the answering machine means of the callee controls said displaying and prompting.

25. A callee of a data conferencing for receiving a data conferencing call from a caller, the callee comprising:

(a) a conference manager; and
(b) an answering machine; wherein:
- the conference manager answers the call if the callee does not answer the call;
- callee displays a callee greeting to the caller to notify the caller that the callee is not answering the call;
- the callee prompts the caller to leave a message with the callee;
- the conference manager establishes a data conference between the caller and callee;
- the conference manager invokes an answering machine of the callee;
- the answering machine of the callee controls said displaying and prompting
- the conference manager determines whether the caller is able to invoke an answering machine of the caller that is compatible with the answering machine of the callee; and
- the conference manager establishes, in accordance with said determination, a conference between the answering machine of the callee and the answering machine of the caller, wherein the answering machine of the callee and answering machine of the caller control said displaying and prompting.

26. The callee of claim 25, further comprising:
a callee message log;
wherein the callee receives the message from the caller and stores the message in a callee message log to notify the callee that the message has been received, if the caller decides to leave the message in response to the prompt.

27. The callee of claim 25, wherein the callee greeting and the message comprise audio and video data.

28. The callee of claim 25, wherein the message comprises a primary message and at least one attached file.

29. The callee of claim 25, wherein:
- the callee displays an incoming call notification when the callee detects the call; and
- the callee provides a user of the callee with an option to answer the call or not.

30. The callee of claim 25, wherein:
- the callee stores a plurality of callee greetings;
- callee greetings are mapped to particular callers depending upon the identity of said particular callers;
- the callee determines the identity of the caller; and
- the callee selects the callee greeting in accordance with the identity of the caller.

31. The callee of claim 25, wherein the conference manager establishes a data conference between the answering machine of the callee and an answering machine of the caller.

32. The callee of claim 25, wherein, if the caller is not able to invoke an answering machine of the caller that is compatible with the answering machine of the callee, then the answering machine of the callee controls said displaying and prompting.

* * * * *